United States Patent
Xu et al.

(10) Patent No.: US 12,052,566 B2
(45) Date of Patent: Jul. 30, 2024

(54) TECHNIQUES FOR SECURITY KEY GENERATION BY USER DEVICES FOR DATA TRANSMISSION IN AN INACTIVE STATE

(71) Applicant: Apple Inc., Cupertino, CA (US)

(72) Inventors: Fangli Xu, Beijing (CN); Shu Guo, Beijing (CN); Yuqin Chen, Beijing (CN); Haijing Hu, Los Gatos, CA (US); Huarui Liang, Beijing (CN); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/593,666

(22) PCT Filed: Jul. 31, 2020

(86) PCT No.: PCT/CN2020/106308
§ 371 (c)(1),
(2) Date: Sep. 22, 2021

(87) PCT Pub. No.: WO2022/021367
PCT Pub. Date: Feb. 3, 2022

(65) Prior Publication Data
US 2023/0141705 A1    May 11, 2023

(51) Int. Cl.
*H04W 12/06* (2021.01)
*H04W 12/041* (2021.01)
(Continued)

(52) U.S. Cl.
CPC ......... *H04W 12/041* (2021.01); *H04W 76/27* (2018.02)

(58) Field of Classification Search
CPC .......................... H04W 12/041; H04W 76/27
See application file for complete search history.

(56) References Cited

U.S. PATENT DOCUMENTS

| | | | |
|---|---|---|---|
| 2011/0044455 A1* | 2/2011 | Huang | H04W 12/041 380/278 |
| 2019/0052607 A1* | 2/2019 | Ohlsson | H04W 76/28 |

(Continued)

FOREIGN PATENT DOCUMENTS

| | | |
|---|---|---|
| WO | 2018057200 A1 | 3/2018 |
| WO | 2019202513 A1 | 10/2019 |
| WO | 2020029165 A1 | 2/2020 |

OTHER PUBLICATIONS

Ericsson, "Security solution for Infrequent Small Data," 3GPP TSG SA WG3 (Security) Adhoc Meeting on FS_NSA, S3-161408, Sep. 20, 2016 (Sep. 20, 2016).

(Continued)

*Primary Examiner* — Moustapha Diaby
(74) *Attorney, Agent, or Firm* — Blank Rome LLP

(57) ABSTRACT

An example technique for security key derivation in a wireless system includes: receiving a radio resource control (RRC) suspend message from a first node, the RRC suspend message including a first next hop (NH) chaining counter (NCC) value, entering a RRC inactive state, deriving a first node key based on the first NCC value, generating a first uplink message for transmission in the RRC inactive state based on the first node key, and transmitting the first uplink message to a node while in the RRC inactive state.

20 Claims, 20 Drawing Sheets

(51) Int. Cl.
H04W 12/08 (2021.01)
H04W 12/12 (2021.01)
H04W 76/27 (2018.01)
H04W 88/02 (2009.01)

(56) References Cited

U.S. PATENT DOCUMENTS

| | | |
|---|---|---|
| 2019/0208411 A1 | 7/2019 | Shrestha |
| 2020/0053791 A1 | 2/2020 | Ozturk |
| 2020/0120499 A1 | 4/2020 | Norrman |
| 2020/0120636 A1 | 4/2020 | Su |
| 2020/0137564 A1 | 4/2020 | Liu |
| 2020/0137602 A1 | 4/2020 | Zhang |

OTHER PUBLICATIONS

OPPO, "Left issues for Inactive security framework," 3GPP TSG-RAN2#101bis, R2-1804551, Apr. 6, 2018 (Apr. 6, 2018).

* cited by examiner

TECHNIQUES FOR SECURITY KEY GENERATION BY USER DEVICES FOR DATA TRANSMISSION IN AN INACTIVE STATE

FIELD

The present application relates to wireless devices, including apparatus, systems, and methods for generating security keys by user devices for use in data transmissions to a node while the user device is in an inactive state.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Aspects of the present disclosure relate to apparatuses, systems, and methods for security key derivation for use by user devices to secure transmissions to a node, while the user device is in an inactive state.

In certain wireless systems, data as between a user device and a central network (CN) may be independently ciphered and/or integrity protected as between the UE and a particular node. These independent layers of ciphers and/or integrity protection help allow for data security and privacy. In certain cases, a UE may enter a radio resource control (RRC) inactive state, whereby a non-access stratum (NAS) connection to a CN is maintained, but access stratum (AS) resources are released. There is a need to allow user devices to transmit data while remaining in the RRC inactive state. As the AS resources are released, there is a need to define ways to determine a ciphering or integrity protection key for use when the user device transmits UL data while remaining in the inactive state.

Thus, according to some aspects disclosed herein, a method for security key derivation in a wireless system, comprising: receiving a radio resource control (RRC) suspend message from a first node, the RRC suspend message including a first next hop (NH) chaining counter (NCC) value; entering a RRC inactive state; deriving a first node key based on the first NCC value; generating a first uplink message for transmission in the RRC inactive state based on the first node key; and transmitting the first uplink message to a node while in the RRC inactive state.

In some aspects, the method may further comprise cases wherein the first NCC value is unchanged from a second NCC value previously used to derive a second node key, and wherein the first node key is the same as the second node key. In some aspects, the method may further comprise cases wherein the first NCC value is different from a second NCC value previously used to derive a second node key. In some aspects, the method may further comprise receiving first cell information from the first node, wherein the first node key is derived based on the first NCC value and the first cell information from the first node; generating a second uplink message for transmission in the RRC inactive state based on the first node key; and transmitting the second uplink message while in the RRC inactive state. In some aspects, the method may further comprise horizontally deriving a third node key based on the first node key generating a third uplink message for transmission in the RRC inactive state based on the third node key; and transmitting the third uplink message to the third node while in the RRC inactive state. In some aspects, the method may further comprise cases wherein the RRC suspend message includes multiple NCC values and further comprising: vertically deriving a second node key based on a second NCC value of the multiple NCC values; generating a second uplink message for transmission in the RRC inactive state based on the second node key; and transmitting the second uplink message to a node while in the RRC inactive state. In some aspects, the method may further comprise cases wherein the first uplink message is transmitted to a second node and further comprising: receiving a second NCC value from the second node; vertically deriving a second node key based on the second NCC value; generating a second uplink message for transmission in the RRC inactive state based on the second node key; and transmitting the second uplink message while in the RRC inactive state to a third node The techniques described herein may be implemented in and/or used with a number of different types of devices, including but not limited to cellular phones, wireless devices, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various aspects is considered in conjunction with the following drawings, in which.

Figure 1:
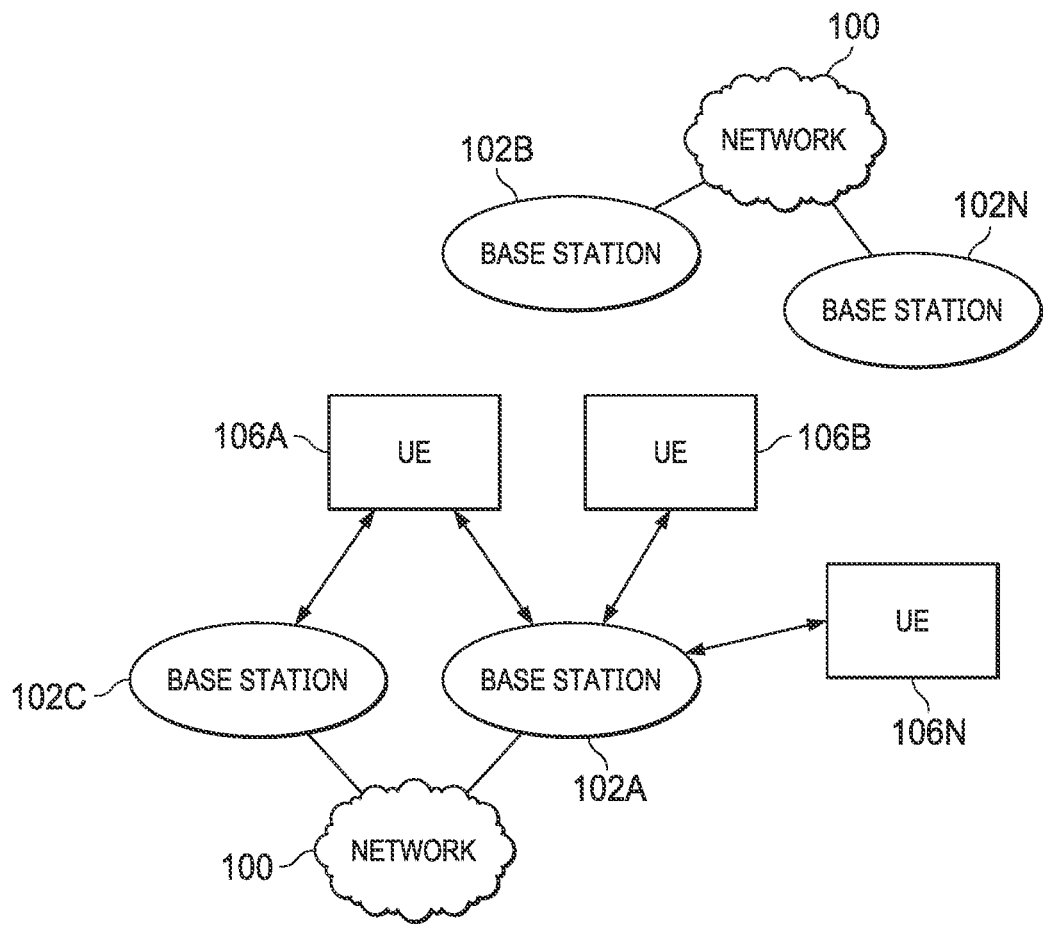
FIG. 1 illustrates an example wireless communication system, in accordance with aspects of the present disclosure.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system. For example, if the base station is implemented in the context of LTE, it may alternately be referred to as an 'eNodeB' or 'eNB'. If the base station is implemented in the context of 5G NR, it may alternately be referred to as a 'gNodeB' or 'gNB'. Although certain aspects are described in the context of LTE or 5G NR, references to "eNB," "gNB," "nodeB," "base station," "NB." etc., may refer to one or more wireless nodes that service a cell to provide a wireless connection between user devices and a wider network generally and that the concepts discussed are not limited to any particular wireless technology. Although certain aspects are described in the context of LTE or 5G NR, references to "eNB," "gNB," "nodeB," "base station," "NB," etc., are not intended to limit the concepts discussed herein to any particular wireless technology and the concepts discussed may be applied in any wireless system.

Node—The term "node," as used herein, may refer to one more apparatus associated with a cell that provide a wireless connection between user devices and a wider network generally.

Processing Element (or Processor)—refers to various elements or combinations of elements that are capable of performing a function in a device, such as a user equipment or a cellular network device. Processing elements may include, for example; processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some aspects. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB." In some aspects, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000) (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Example User Equipment (UE)

Figure 2:
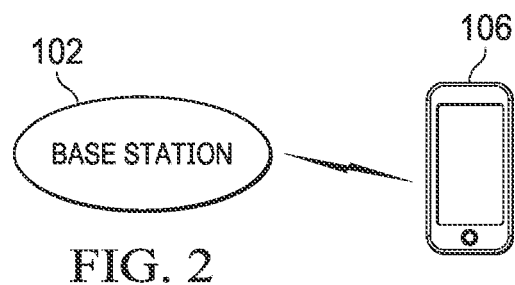
FIG. 2 illustrates a base station (BS) in communication with a user equipment (UE) device, in accordance with aspects of the present disclosure.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method aspects described herein, or any portion of any of the method aspects described herein.

The UE 106 may include one or more antennas for communicating using one or more wireless communication protocols or technologies. In some aspects, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Example Communication Device

Figure 3:
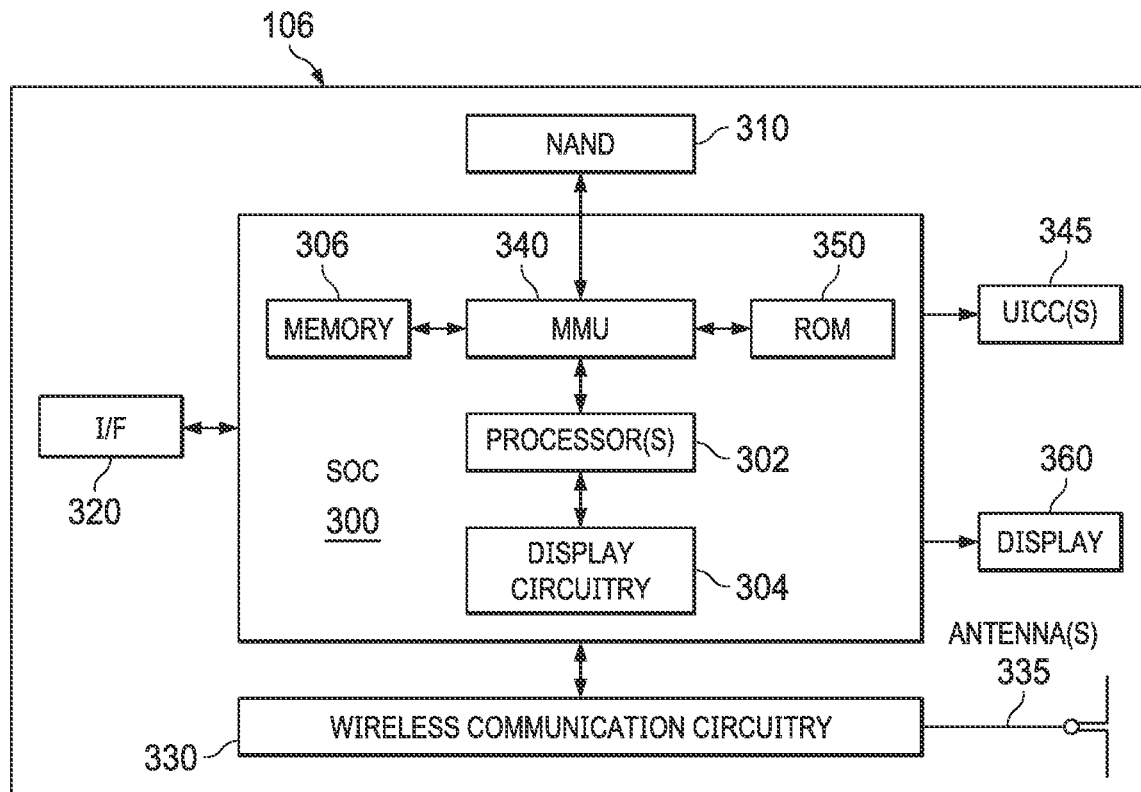
FIG. 3 illustrates an example block diagram of a UE, in accordance with aspects of the present disclosure.

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station, input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some aspects, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some aspects, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Example Base Station

Figure 4:
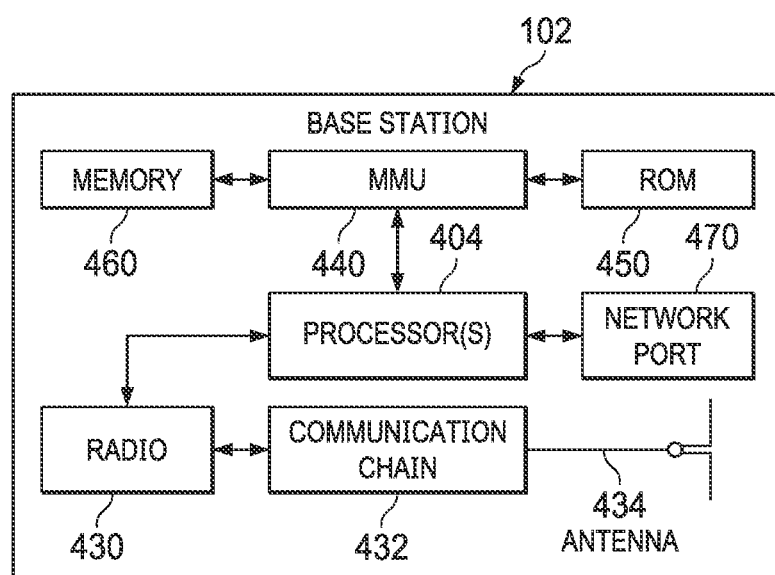
FIG. 4 illustrates an example block diagram of a BS, in accordance with aspects of the present disclosure.

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB." In such aspects, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR. LTE, LTE-A. GSM, UMTS. CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Example Cellular Communication Circuitry

Figure 5:
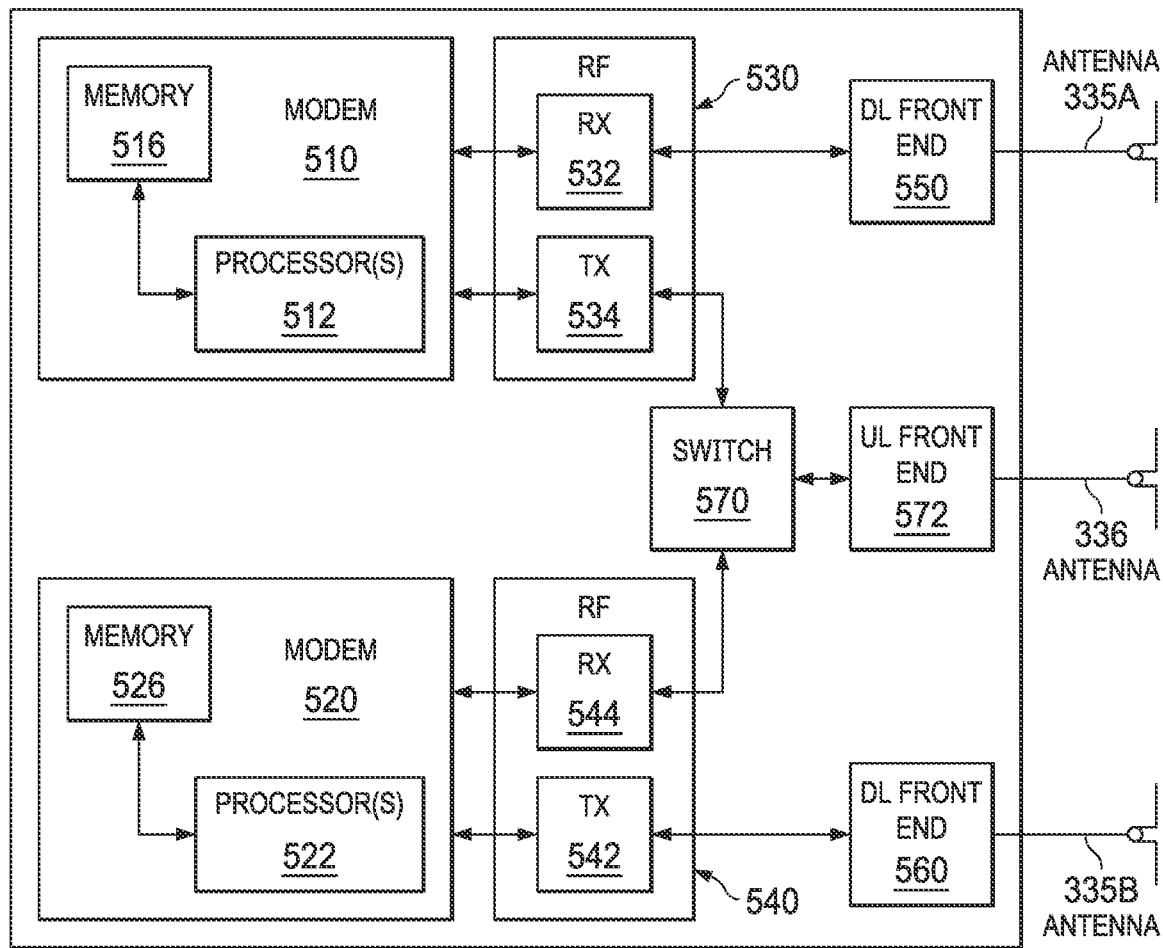
FIG. 5 illustrates an example block diagram of cellular communication circuitry, in accordance with aspects of the present disclosure.

FIG. 5 illustrates an example simplified block diagram of cellular communication circuitry, according to some aspects. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown. In some aspects, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335*b*.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some aspects, the cellular communication circuitry 330 may include only one transmit/receive chain. For example, the cellular communication circuitry 330 may not include the modem 520, the RF front end 540, the DL front end 560, and/or the antenna 335*b*. As another example, the cellular communication circuitry 330 may not include the modem 510, the RF front end 530, the DL front end 550, and/or the antenna 335*a*. In some aspects, the cellular communication circuitry 330 may also not include the switch 570, and the RF front end 530 or the RF front end 540 may be in communication, e.g., directly, with the UL front end 572.

Example Network Element

Figure 6:
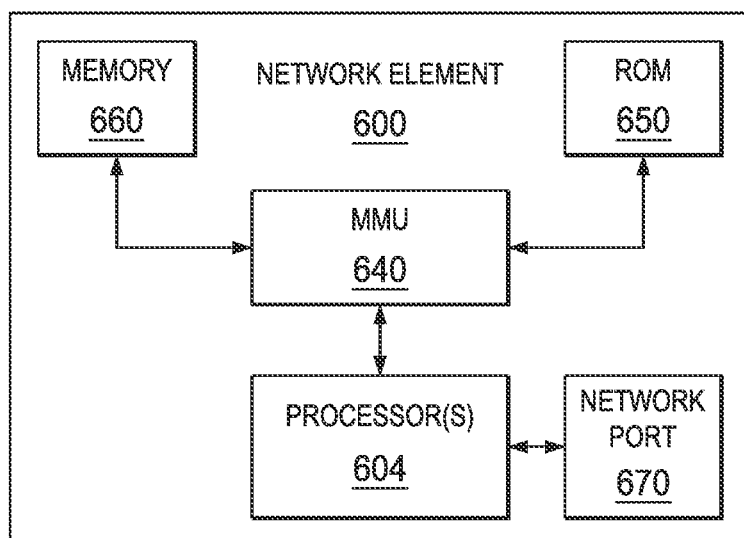
FIG. 6 illustrates an example block diagram of a network element, in accordance with aspects of the present disclosure.

FIG. 6 illustrates an exemplary block diagram of a network element 600, according to some aspects. According to some aspects, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof. The network element 600 may operate according to the various methods as disclosed herein for wireless devices to perform cell measurements using configured reference signals while in an inactive state in a cellular communication system.

Radio Resource Control (RRC) IDLE and INACTIVE States

Multiple cellular communication technologies include the use of a radio resource control (RRC) protocol, e.g., which may facilitate connection establishment and release, radio bearer establishment, reconfiguration, and release, and/or various other possible signaling functions supporting the air interface between a wireless device and a cellular base station.

A wireless device may commonly operate in one of multiple possible states with respect to RRC. For example, in LTE, a wireless device may operate in an RRC connected state (e.g., in which the wireless device can perform continuous data transfer, and in which handover between cells is managed by the network and access stratum (AS) context information is retained for the wireless device), or in an RRC idle state (e.g., in which the wireless device may operate in a more battery efficient state when not performing continuous data transfer, in which the wireless device may handle it's cell re-selection activities, and in which the network may not retain AS context information for the wireless device).

In addition to RRC connected and RRC idle states, it may also be possible to support one or more other types of RRC states for a wireless device, at least according to some aspects. For example, for NR, an RRC inactive state in which a wireless device may be able to operate in a relatively battery efficient state while the network also retains at least some AS context information may be supported. In some aspects, the wireless device may maintain a non-access stratum connection (NAS) with the CN and RRC configuration as before the UE entered the inactive state. In certain cases, dedicated AS resources may not be allocated to the UE in the inactive state. At least according to some aspects, such a state may employ wireless device based mobility, e.g., such that a wireless device can move within a radio access network notification area (RNA) without notifying the next generation (NG) radio access network (RAN). While in this state, a wireless device may perform cell re-selection and system information acquisition for itself. At the same time, the last serving base station (e.g., gNB) may keep the wireless device context and the NG connection with the 5G core network (CN) associated with the wireless device, e.g., to facilitate easier transition back to an RRC connected state. When paging a wireless device in RRC inactive state, RNA specific parameters may be used by the RAN, for example including a UE specific DRX and UE Identity Index value (e.g., I-RNTI).

A wireless device operating in such an RRC inactive state may perform RNA updates periodically (e.g., based on a configured periodic RNA update timer) and/or in an event based manner, e.g., w % ben the wireless device moves out of its current configured RNA to a different RNA, according to some aspects.

Use of an RRC inactive state may help reduce the network signaling overhead for a wireless device's connection, at least in some instances. For example, for a wireless device with infrequent data transmissions, utilizing such an RRC inactive state may reduce the amount of mobility related signaling (e.g., for handovers) needed compared to an RRC connected state, e.g., since the wireless device may be able to manage its own cell re-selection process when moving between cells. For such a wireless device, utilizing an RRC inactive state may also reduce the amount of connection setup related signaling needed compared to an RRC idle state, e.g., since the network may retain at least some context information for the wireless device. This may directly reduce the signaling latency associated with a transition to an RRC connected state.

As another potential benefit, such a state may reduce the control plane delay for a wireless device, e.g., in comparison to operating in an RRC idle state. For example, a reduced access stratum connection setup period and/or non-access stratum connection setup period may be possible for an RRC inactive state relative to an RRC idle state. The time to move from a battery efficient state to the start of continuous data transfer may thus be reduced.

Additionally, such a state may improve the power saving capability of a wireless device, e.g., in comparison to operating in an RRC connected state. For example, while in RRC connected state, serving and/or neighboring cell measurements may be required more frequently than while in RRC inactive state, e.g., at least in line with a connected mode discontinuous reception (C-DRX) period of the wireless device.

The wireless device may manage cell re-selection while in an RRC inactive state. A goal of the cell re-selection process may include keeping a wireless device camped on a suitable cell, which may include a cell with sufficient signal strength, signal quality, and/or other characteristics such that the wireless device may be able to establish/activate a connection and perform data transfer via the cell. Cell re-selection may include either or both of intra-frequency cell re-selection or inter-frequency cell re-selection. As part of cell re-selection process while in such an RRC inactive state, a wireless device may perform cell measurements on serving and/or neighboring cells. The manner in which these cell measurements are performed can potentially have a substantial impact on wireless device power consumption and the amount of time needed to access continuous data transfer capability (e.g., by resuming operation in RRC connected state). For example, if synchronization signal blocks (SSBs) are used to perform cell measurements, there may be a delay between a wireless device's inactive state wakeup instance and the next SSB burst, and/or measurements may be performed over a relatively long period of time to allow for receiver beam sweeping over multiple SSB bursts. Further, such SSB bursts may be performed at a different frequency and/or at a wider bandwidth than the wireless device's specified inactive state wakeup instance. Alternatively, a cellular base station could provide paging instances that are aligned with SSBs in time and/or frequency domains, e.g., to facilitate reduced wireless device power consumption in RRC inactive state.

Figure 7:
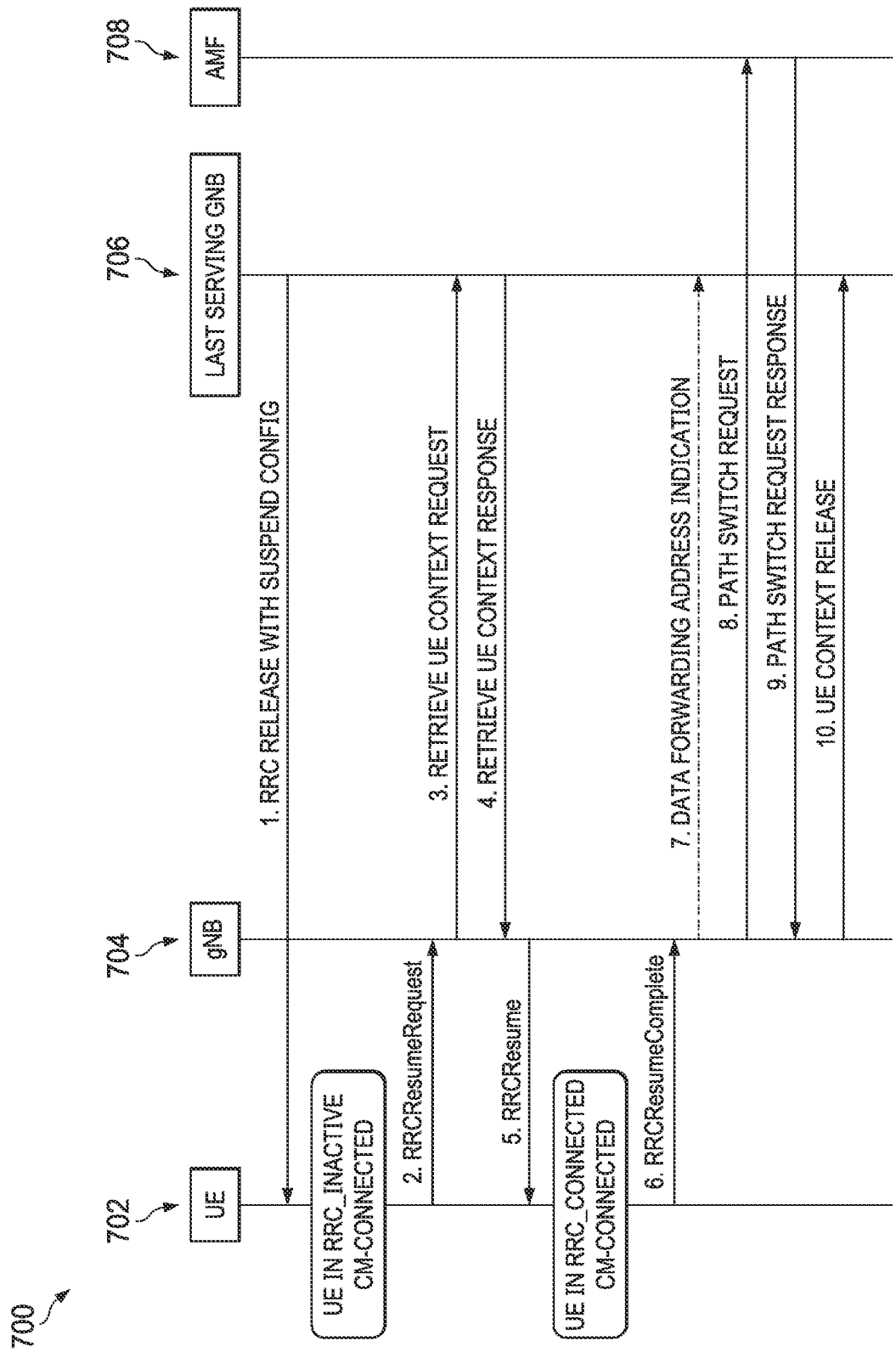
FIGS. 7-8 are communications flow diagrams illustrating communications flows for entering and resuming from an RRC inactive state, in accordance with aspects of the present disclosure.

FIG. 7 is a communications flow diagram illustrating a communications flow 700 for entering and resuming from an RRC inactive state, in accordance with aspects of the present disclosure. Aspects of the communications flow may be implemented by a wireless device, e.g., in conjunction with a one or more wireless devices and one or more portions of a core network (CN), such as a UE 702, gNB 704, last serving gNB 706, and Access and Mobility Functions (AMF) 708 illustrated in and described with respect to FIG. 7, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In the communications flow 700, the wireless device, such as UE 702, receives, for example, an RRC release message from a last serving gNB 706 (Step 1). The RRC release message may include suspend configuration information for entering the RRC inactive state by the UE 702. The suspend configuration information may include information for operating in and/or resuming the connection from the RRC inactive state, such as information about a RNA and security parameters for supporting an encrypted resume message, such as a UE identifier and resume security information. An RNA may comprise an area associated with a set of gNBs within which the UE is allowed to move without having to notify the network.

In certain cases, the UE 702 may want to perform a dedicated data transmission/reception which cannot be performed in the inactive state. To exit the inactive state, the UE 702 may initiate an RRC resume procedure by transmitting a RRC resume request to a gNB, in this example, gNB 704, which is a different gNB than the last serving gNB 706 (Step 2). The RRC resume request may include, for example, the UE identifier and resume security information. The gNB 704 may then retrieve a context for the UE 702 from the last serving gNB (Step 3). After receiving the UE context (Step 4) the gNB 704 may send the UE 702 a RRC resume message in response to the RRC resume request (Step 5). The UE 702 may then transition to an RRC connected state 710 and send a RRC resume complete message to the gNB 704 (Step 6).

The gNB 704 then performs a UE handover from the last serving gNB 706 by sending a data forwarding address indication to the last serving gNB (Step 7) and a path switch request to the AMF 708 (Step 8). The AMF 708 responds with a path switch request response (Step 9) and the gNB sends a UE context release to the last serving gNB 706 (Step 10).

In certain wireless communication networks, ciphering and/or integrity protection may be used to help provide data integrity and security. For example, in 5G NR, user data in data radio bearers (DRBs) blocks may be ciphered to provide data confidentiality and integrity protection for user data. Additionally. RRC signaling in signaling radio bearers (SRBs) blocks are separately ciphered from user data to help provide signaling data confidentiality and wireless network integrity. Keys used for NAS level security as between the CN and wireless devices are thus cryptographically separated from AS keys used, for example, RRC signaling. In certain cases, a sequence number may be used as an input to the ciphering and/or integrity protection. For example, a next hop (NH) chaining counter (NCC) sequence number may be used in conjunction with a NH parameter value to generate a key for use between a UE and a gNB ($K_{gNB}$). The NH parameter value may be computed by the AMF and the UE, but not by the gNB, and the NCC sequence number may be provided by the AMF (as discussed in more detail below).

Figure 8:
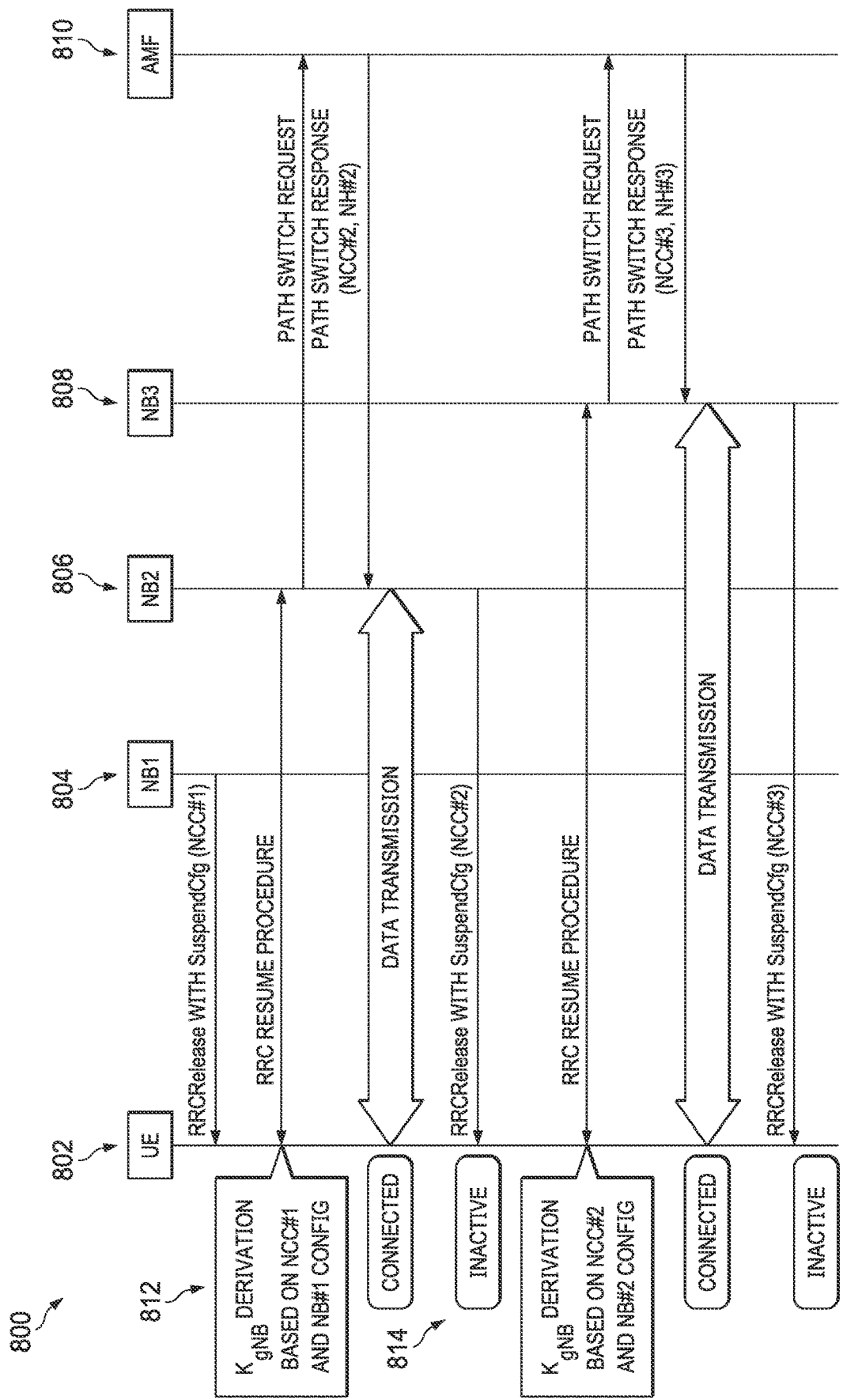

FIG. 8 is a communications flow diagram illustrating a communications flow 800 for entering and resuming from an RRC inactive state, in accordance with aspects of the present disclosure. In communications flow 800, UE 802 receives an RRC release message from gNB1 804. In certain cases, the RRC release message includes suspend configuration information along with resume security information including a first NCC sequence number. The gNB1 804 may obtain the NCC and corresponding NH parameter pair, for example, from the AMF 810, prior to transmitting the RRC release message to the UE 802 (not shown). After receiving the RRC release message from the gNB1 804, the UE 802 may enter the RRC inactive state. After determining that the UE needs to exit the RRC inactive state, the UE 802 may derive 812 a gNB key ($K_{gNB}^*$) for use between UE 802 and a target gNB within the UE's RNA before transmitting an RRC resume message to the target gNB, in this case, target gNB2 806. The RRC resume message may be ciphered and/or integrity protected using the derived gNB key ($K_{gNB}^*$) and may include security information, such as an authentication token. The gNB key ($K_{gNB}^*$) may be derived based on the target gNB information. As an example, the target gNB information may include the target gNB2's 806 physical cell ID (PCI), cell-identity (Cell-ID), and cell radio network temporary identifier (C-RNTI).

After receiving the RRC resume message, the target gNB 806 forwards the security information along with target gNB 806 information to the source gNB (e.g., the gNB which was previously communicating with the UE), here gNB1 804 (not shown). The source gNB1 804 then calculates the gNB key ($K_{gNB}^*$) based on, among other variables, the target gNB2 806 information and the NCC/NH parameter pair. The source gNB1 804 may then transmit back to the target gNB2 806 the calculated gNB key ($K_{gNB}^*$) along with the NCC associated with the gNB key ($K_{gNB}^*$), ciphering and/integrity protection algorithm, security policy, and other security information (not shown).

The target gNB2 806 may also send a path switch request to the AMF to initiate a handover of the UE 802 from the source gNB1 804 to the target gNB2 806. The AMF may response with a path switch response acknowledge the handover and providing to the target gNB 806 a second $NCC_2$ and corresponding second $NH_2$ parameter pair. The target gNB2 806 may send an RRC resume procedure message back to the UE 802 and communicates with the UE 802 in a RRC connected state using the calculated gNB key ($K_{gNB}^*$). After communicating, the UE 802 may to return to an RRC inactive state 814 after receiving a second RRC release message from the target gNB2 806. The second RRC release message may also include suspend configuration information along with resume security information including the second $NCC_2$ and the corresponding second $NH_2$ parameter pair.

Similarly, to exit the RRC inactive state, the UE 802 may derive a second gNB key ($K_{gNB2}^*$) for use between UE 802 and a second target gNB3 808, also within the UE's RNA. The gNB key ($K_{gNB2}^*$) may be derived based on the target gNB information, which may include, for example, the target gNB3's 806 PCI, Cell-ID, C-RNTI. The UE 802 may then transmit a second RRC resume message to target gNB 3 808 using the second gNB key ($K_{gNB2}^*$). This second RRC resume message may also include security information, such as an authentication token. After receiving the second RRC resume message, the target gNB3 forwards the security information along with second target gNB3 808 information to a second source gNB, now gNB2 806 as the UE was handed over from gNB1 to gNB2 previously. The second source gNB2 806 then calculates the second gNB key ($K_{gNB2}^*$) based on, among other variables, the second target gNB3 808 information and the NCC/NH parameter pair. The second source gNB2 806 may then transmit back to the second target gNB3 808 the calculated second gNB key ($K_{gNB2}^*$) along with the NCC associated with the second gNB key ($K_{gNB2}^*$), ciphering and/or integrity protection algorithm, security policy, and other security information (not shown). The second target gNB3 808 may also send a path switch request to the AMF to initiate a second handover of the UE 802 from the second source gNB2 806 to the second target gNB2 808. The AMF may response with a path switch response acknowledge the handover and providing to the second target gNB 808 a third $NCC_3$ and corresponding third $NH_3$ parameter pair. The second target gNB 808 may send an RRC resume procedure message back to the UE 802 and communicates with the UE 802 in a RRC connected state using the second calculated gNB key ($K_{gNB2}^*$). After communicating, the UE 802 may to return to the RRC inactive state after receiving a third RRC release message from the second target gNB1 808. The third RRC release message may also include suspend configuration information along with resume security information including the third $NCC_3$ and the corresponding third $NH_3$ parameter pair.

Figure 9:
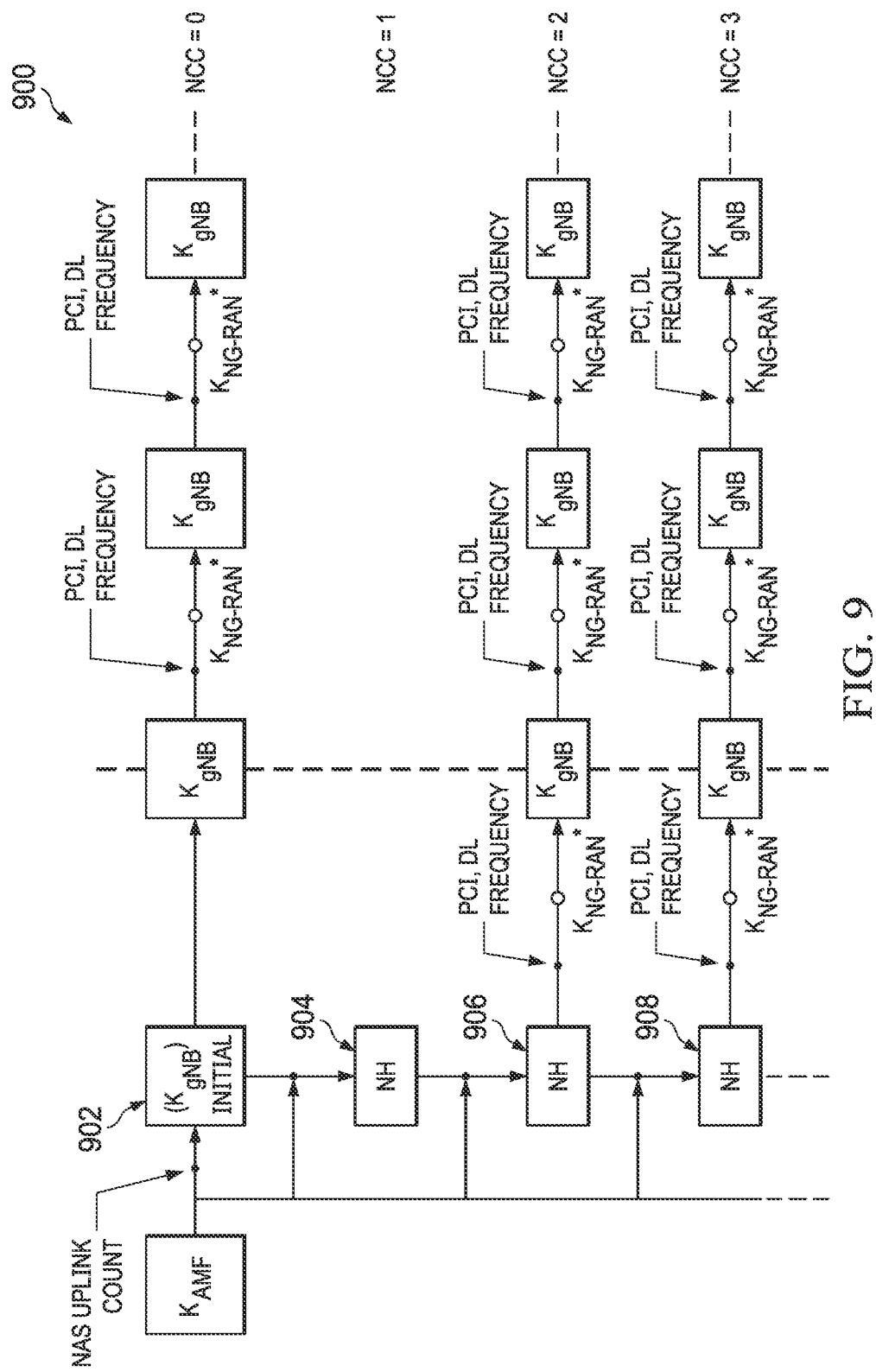
FIG. 9 is a diagram illustrating key derivation, in accordance with aspects of the present disclosure.

FIG. 9 is a diagram illustrating key derivation 900, in accordance with aspects of the present disclosure. As a part of initially setting up AS keys, a UE and an AMF may share an AMF key $K_{AMF}$ from which an initial gNB key $K_{gNB}$ 902 and a first NH 904 parameter may be derived from by both the UE and the AMF. The initial gNB key $K_{gNB}$ 902 may be derived in part based on a NAS uplink count with the CN. This initial gNB key $K_{gNB}$ 902 may be associated with an NCC=0, while the first NH 904 may be derived from the initial gNB key $K_{gNB}$ 902 and is associated with NCC=1.

After this initial setup, this first pair of gNB key and NH parameter, initial $K_{gNB}$ 902 and first NH 904, will not be used to derive a gNB key. To derive a new gNB key, two techniques may be used. Vertical derivation of a new gNB key may be performed when there is an unused NCC/NH pair at the gNB. As discussed above, a gNB may obtain NH/NCC pairs from the AMF and if the gNB has an unused NH/NCC pair, the gNB may vertically derive a new gNB key $K_{gNB}$ using the unused NH 906 along with gNB information, such as PCI, Cell-ID. C-RNTI, etc. The gNB may also provide the NCC/NH pair to the UE, to derive the new gNB key $K_{gNB}$. Horizontal derivation of a new gNB key may be performed if there are no unused NCC/NH pairs available at the gNB. Horizontal derivation is based on a currently active gNB key, called $K_{NG-RAN}$ along with gNB information. A gNB may signal to a UE to use vertical derivation or horizontal derivation of the new gNB key in the RRC release message. If the NCC included in the RRC release message matches the NCC value currently in use, then the new gNB key may be derived using horizontal derivation. If the NCC value included in the RRC release message is a new NCC value, then the new gNB key may be derived using vertical derivation.

UE Data Transmission in an RRC Inactive State

In certain cases, it may be desirable to allow a UE to transmit UL data while remaining in the RRC inactive state and without transitioning to the RRC connected state. To transmit in the RRC inactive state, the UE would not send an RRC resume request prior to transmitting UL data. A target gNB that is within the UE's configured RNA, but is not the previous serving gNB, would not be able to retrieve NCC and calculated gNB key from the original serving gNB prior to the UL and it may be desirable to provide an improved technique for key generation for transmissions while in an inactive state.

Figure 10:
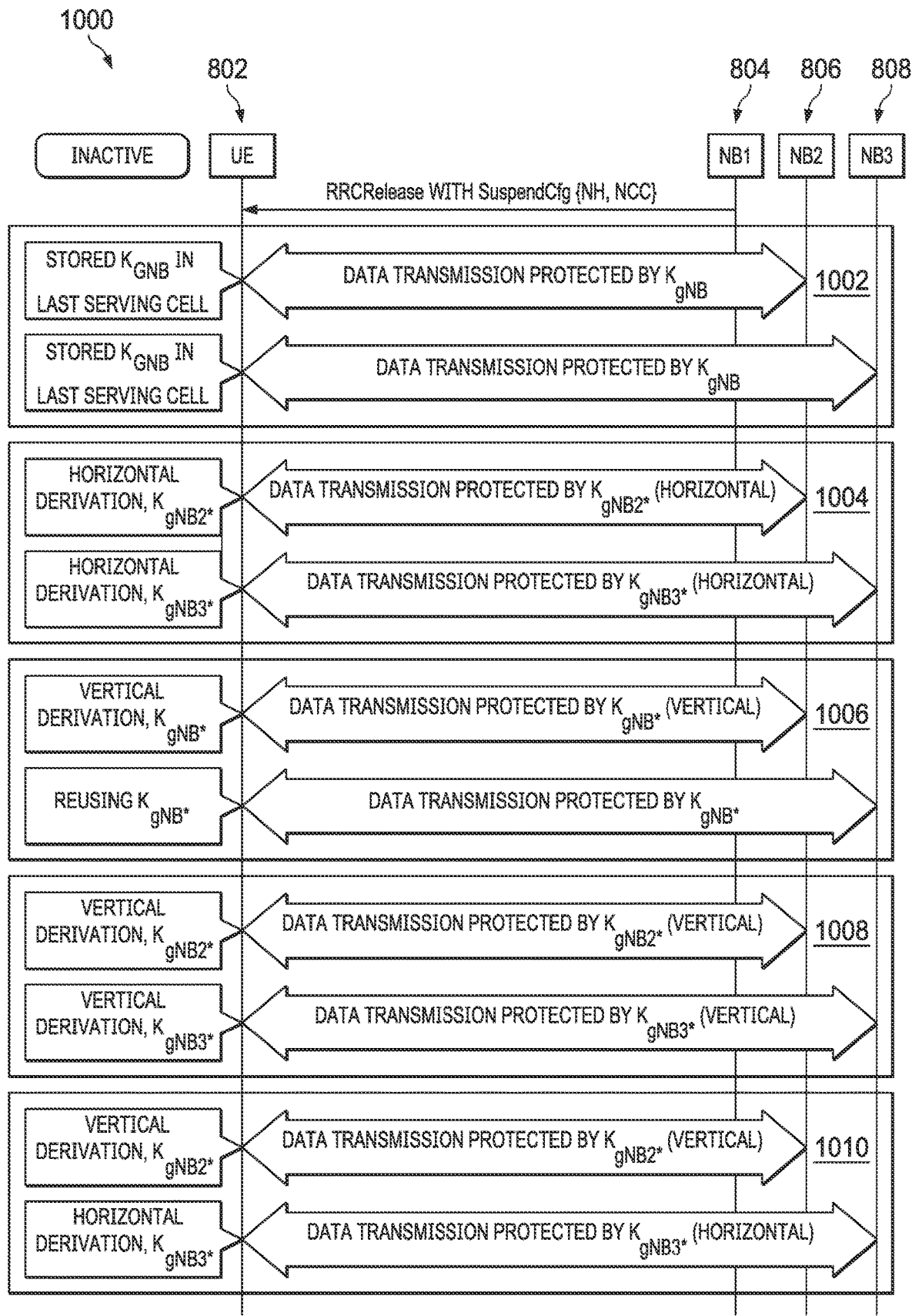
FIGS. 10-20 are communications flow diagrams illustrating example techniques for key generation for inactive state data transmissions, in accordance with aspects of the present disclosure.

FIG. 10 is a communications flow diagram illustrating techniques 1000 for key generation for inactive state data transmissions, in accordance with aspects of the present disclosure. In certain cases, key generation for inactive state data transmissions may be performed using a single NCC value to generate keys for multiple gNBs. In these cases, multiple new gNB values may be derived from the single NCC value included in the RRC release message. This NCC value may be either a new NCC value or an NCC value currently in use. There may be multiple options for deriving multiple new gNB keys from the single NCC value.

In a first option 1002, the last gNB key from the last serving cell may be reused for each data transmission in the RRC inactive state. In the first option 1002, the UE 802 receives an NCC value from a source gNB1 804 in the RRC release message and derives a gNB key ($K_{gNB}$) based on the received NCC value and stores the derived gNB key ($K_{gNB}$). The UE 802 may then transmit data ciphered and/or integrity protected with the derived gNB key ($K_{gNB}$) while in the RRC inactive state to a target gNB2 806, which is different from the source gNB1 804 and within the UE's configured RNA. The UE 802 may also transmit data ciphered and/or integrity protected using the same stored derived gNB key ($K_{gNB}$) to another target gNB3 808 within the UE's configured RNA, which is different from the source gNB1 804 and the target gNB2 806, and within the UE's configured RNA. Of note, the same gNB key ($K_{gNB}$) is used to cipher and/or integrity protect data to multiple gNBs in the first option 1002.

As discussed above, the source gNB 804 receives an NCC/NH pair from AMF to derive the gNB key ($K_{gNB}$). This NCC/NH pair is only provided to the source gNB 804 from the AMF. For each option, on the network side, data security handing may be provided by the source gNB or data security may be performed by each accessed gNB. In the first option 1002, if data security is handled by the source gNB1 804, when the data transmitted by the UE 802 in the inactive state to a target gNB, such as either target gNB2 806 or target gNB3 808, the target gNB forwards the security information of the data transmitted along with target gNB information to the source gNB1 804. The source gNB1 804 then returns the derived gNB key ($K_{gNB}$) to the target gNB. If data security is handled by each accessed gNB, the source gNB1 804, after transmitting the RRC release message, including RNA information, to the UE 802, may broadcast UE context information including the derived gNB key to the other gNBs in the configured RNA of the UE 802. Then, when the UE 802 transmits data to, for example target gNB3 808, in the inactive state, the target gNB3 808 will have the derived gNB key ($K_{gNB}$) to decrypt transmitted AS data.

In certain cases, a second option 1004 may be used to derive a new gNB key ($K_{gNB*}$) for each data transmission in the RRC inactive state. In the second option 1004, the UE 802 also receives an NCC value from a source gNB1 804. For each data transmission in the RRC inactive state, the UE derives a new gNB key ($K_{gNB*}$) using horizontal derivation. The horizontal derivation may be based on the currently active gNB key ($K_{NG-RAN}$) based on the received NCC value, along with gNB information of the target gNB. For example, the UE 802 receives an NCC value from a source gNB1 804 in the RRC release message and derives a gNB key ($K_{NG-RAN}$) based on the received NCC value. When the UE 802 wants to transmit data in the inactive state, the UE 802 selects a target gNB, such as target gNB2 806 and obtains gNB information, such as PCI, Cell-ID, C-RNTI, etc., broadcast by the target gNB2 806. The UE 802 then horizontally derives a new gNB key ($K_{gNB2*}$) based on the gNB information and derived gNB key ($K_{NG-RAN}$). For each additional transmission, the UE horizontally derives another new gNB key ($K_{gNB2*}$). If the UE 802 wants to transmit in the inactive state to another target gNB, such as target gNB3 808, the UE 802 horizontally derives a new gNB key ($K_{gNB3*}$) for the target gNB3 808 based on the gNB information for the target gNB3 808.

For the second option 1004, on the network side, data security handing again may be provided by the source gNB or data security may be performed by each accessed gNB in a manner similar to that discussed above with respect to the first option 1002.

In certain cases, a third option 1006 may be used to vertically derive a new gNB key ($K_{gNB}$) for data transmissions in the RRC inactive state. This new gNB key ($K_{gNB}$) may be used for all data transmission in the RRC inactive state. As an example, the UE 802 receives an NCC value from a source gNB1 804 in the RRC release message. In certain cases, the UE 802 may vertically derive a new gNB key ($K_{gNB}$) based on the NCC value and gNB information of the target gNB2 806. In other cases, the UE 802 may determine an initial target gNB, such as target gNB2 806, for transmitting data to in the RRC inactive state and obtain gNB information broadcast by the target gNB2 806. In this example, the initial target gNB may be the first gNB that the UE 802 transmits to in the inactive state. The UE 802 may then vertically derive a new gNB key ($K_{gNB}$) based on the NCC value and the obtained gNB information of the target gNB2 806. The UE 802 may then reuse the derived new gNB key ($K_{gNB}$) for each subsequent data transmission. Continuing the previous example, the UE 802 may then use the previously derived new gNB key ($K_{gNB}$) to transmit data in the RRC inactive state to another target gNB, such as target gNB3 808.

For the third option 1006, on the network side, data security handing again may be provided by the source gNB or data security may be performed by each accessed gNB in a manner similar to that discussed above with respect to the first option 1002. In addition, data security may be performed by the source gNB and the initial target gNB. For example, the initial target gNB, such as target gNB2 806, may forward the security information of the data transmitted by the UE 802 along with initial target gNB information to the source gNB1 804. The source gNB1 804 then returns the derived gNB key ($K_{gNB}$) to the initial target gNB. The source gNB 806 or initial target gNB2 may then broadcast the derived gNB key ($K_{gNB}$) to the other gNBs of the UE's RNA.

In certain cases, a fourth option 1008 may be used to vertically derive a new gNB key ($K_{gNB}$) for each data transmissions in the RRC inactive state. As an example, the serving gNB1 804 receives an NCC value and NH parameter pair from the AMF. The UE 802 receives an NCC value from the source gNB1 804 in the RRC release message. When the UE 802 wants to transmit data in the inactive state, the UE 802 selects a target gNB, such as target gNB2 806, and obtain gNB information, broadcast by the target gNB2 806. The UE 802 may then vertically derive a new gNB key ($K_{gNB2*}$) based on the NCC value and the obtained gNB information of the target gNB2 806. The UE 802 may then transmit data to the target gNB2 806 using the vertically derived new gNB key ($K_{gNB2*}$). The target gNB2 806 may then forward the security information from the received data and gNB information to the source gNB1 804 and the source gNB1 804 may then return the derived gNB key ($K_{gNB2}$) to the target gNB2 806. In other cases, data security may be performed by each accessed gNB in a manner similar to that discussed above with respect to the first option 1002 where the source gNB1 804 may broadcast the NCC value and NH parameter pair to the other gNBs in the configured RNA of the UE 802. If the UE 802 wants to transmit data in the inactive state to another target gNB, for example target gNB3 808, the UE 802 obtains gNB information of the target gNB3 808, vertically derives a new gNB key ($K_{gNB3*}$) based on the previously obtained NCC value and the obtained gNB information of the target gNB3 808, and transmits the data to the target gNB3 808. The target gNB3 808 may then either obtained the derived gNB key ($K_{gNB3}$) from the source gNB1 804 or derive the gNB key ($K_{gNB3}$) from the broadcast NCC value and NH parameters in a manner similar to that described for target gNB2 806 above.

In certain cases, a fifth option 1010 may be used to vertically and horizontally derive new gNB keys ($K_{gNB*}$) for data transmissions in the RRC inactive state. In the fifth option 1010, a new gNB key ($K_{gNB*}$) may be derived for each data transmission where the new gNB key ($K_{gNB*}$) is vertically derived for the initial transmission, and horizontally derived for subsequent data transmissions. As an example, the serving gNB1 804 receives an NCC value and NH parameter pair from the AMF. The UE 802 receives an NCC value from the source gNB1 804 in the RRC release message. When the UE 802 wants to transmit data in the inactive state, the UE 802 selects a target gNB, such as target gNB2 806, and obtain gNB information, broadcast by the target gNB 806. The UE 802 may then vertically derive a new gNB key ($K_{gNB2*}$) based on the NCC value and the obtained gNB information of the target gNB2 806. If the UE 802 wants to transmit more data in the inactive state, the UE 802 may select another target gNB, such as target gNB3 808, obtain gNB information from the target gNB3 808, and horizontally derive a new gNB key ($K_{gNB3*}$) based on the previous gNB key, NCC value, and gNB information from the target gNB3 808.

For the fifth option 1010, on the network side, data security handing again may be provided by the source gNB or data security may be performed by each accessed gNB in a manner similar to that discussed above with respect to the first option 1002 and fourth option 1008.

Figure 11:
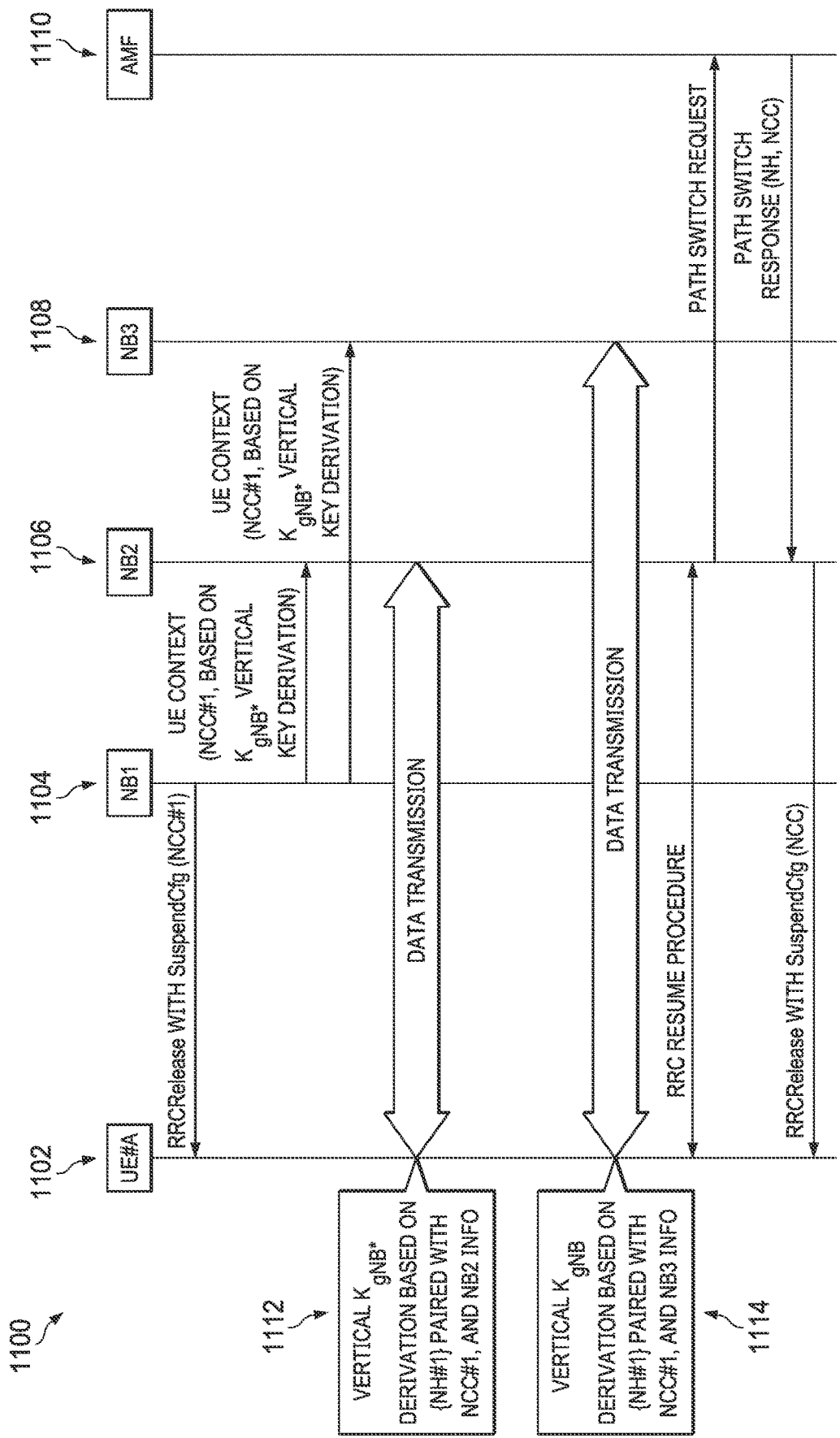

FIG. 11 is a communications flow diagram illustrating a communications flow 1100 for entering and resuming from an RRC inactive state, in accordance with aspects of the present disclosure. The communications flow 1100 illustrates an example corresponding to the fourth option 1008 and where data security is handled by each accessed gNB, as discussed in conjunction with FIG. 10. In this example, the serving gNB1 1104 receives a first NCC value and NH parameter pair from the AMF (not shown). The serving gNB1 1104 then transmits RRC release message to the UE 1102 with the first NCC value and suspend configuration information including RNA information. The serving gNB1 1104 then sends UE context information including the received first NCC value and NH parameter pair to other gNBs in the RNA of the UE 1102, such as target gNB2 1106 and target gNB3 1109. The other gNBs may then vertically derive new gNB keys ($K_{gNB*}$) based on the received first NCC value, NH parameter, and their gNB information. When the UE 1102 wants to transmit data in the inactive state, the UE 1102 selects a target gNB, such as target gNB2 1106, and obtains gNB information, broadcast by the target gNB2 1106. The UE 1102 may then vertically derive a new gNB key ($K_{gNB2*}$) based on the NCC value and the obtained gNB information of the target gNB2 1106. The UE 1102 may then transmit data to the target gNB2 1106 using the vertically derived new gNB key ($K_{gNB2*}$). The target gNB2 1106 derives 1112 the new gNB key ($K_{gNB2*}$) as discussed above to access AS data received from the UE 1102. Similarly, when the UE 1102 wants to transmit data in the active state to target gNB3 1108, the UE 1108 may vertically derive another new gNB key ($K_{gNB3*}$) based on the NCC value and the obtained gNB information of the target gNB8 1108. The target gNB8 1108 derives 1114 the new gNB key ($K_{gNB3*}$) as discussed above to access AS data received from the UE 1102. In certain cases, the UE 1102 may want to transition to a connected state on a target gNB2 1106 different from the source gNB1 1104. In such cases, the UE 1102 may perform an RRC resume procedure in a manner similar to that described above in conjunction with FIG. 7. The UE 1102 may also return to the inactive state in a manner similar to that described above in conjunction with FIG. 7.

Figure 12:
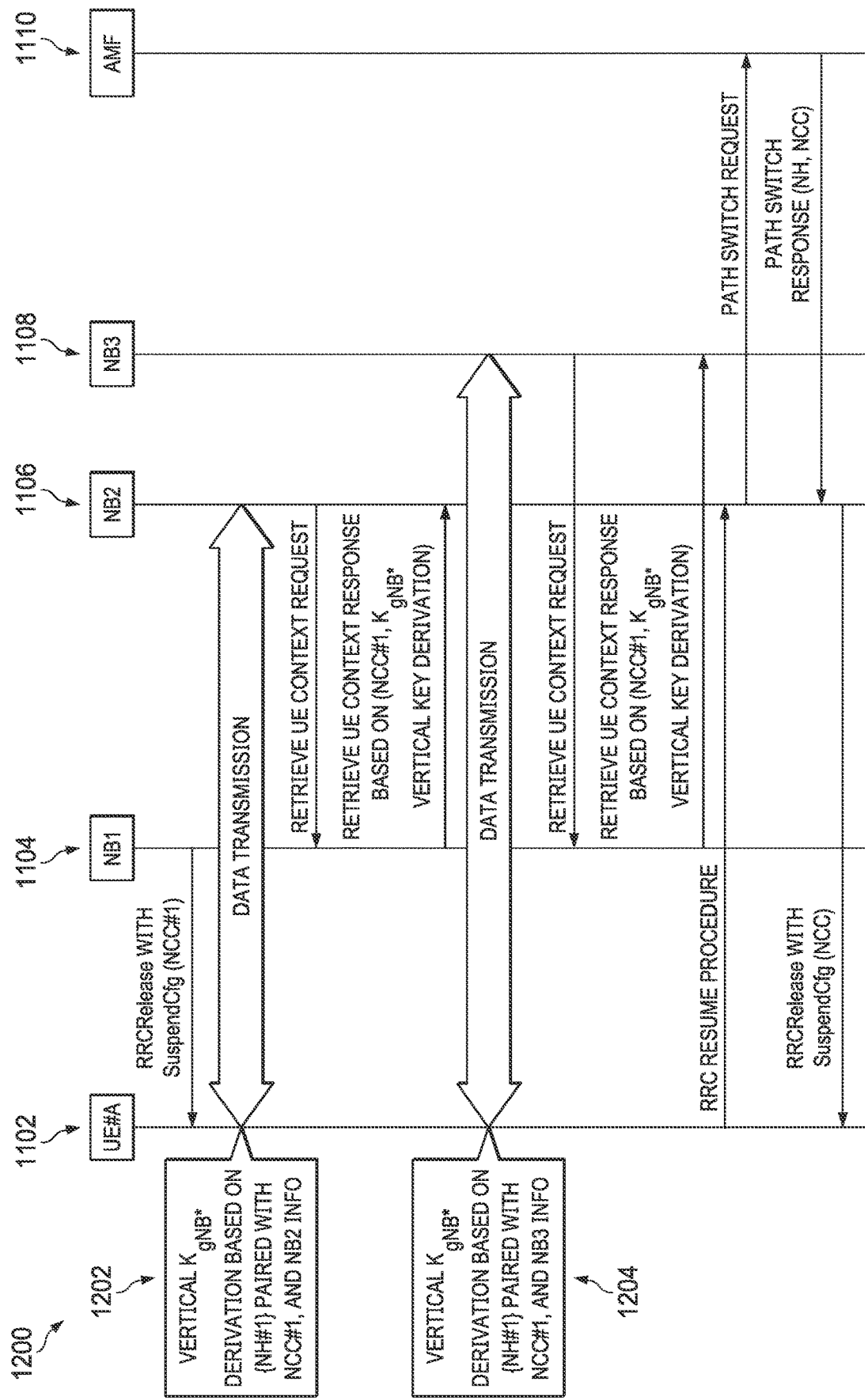

FIG. 12 is a communications flow diagram illustrating a communications flow 1200 for entering and resuming from an RRC inactive state, in accordance with aspects of the present disclosure. The communications flow 1200 illustrates an example corresponding to the fourth option 1008 and where data security is handled by the source gNB, as discussed in conjunction with FIG. 10. In this example, the serving gNB1 1104 receives a first NCC value and NH parameter pair from the AMF (not shown). The serving gNB1 1104 then transmits RRC release message to the UE 1102 with the first NCC value and suspend configuration information including RNA information. After the data transmitted by the UE 1102 in the inactive state is received by a target gNB, such as either target gNB2 1106, the target gNB forwards the security information along with target gNB information to the source gNB1 1104. The source gNB1 1104 then vertically derives 1202 a new gNB key ($K_{gNB2*}$) based on the target gNB information, the first NCC value, and NH parameter and transmits the derived new gNB key ($K_{gNB*}$) to the target gNB2 1106. Similarly, the source gNB1 1104 may vertically derive 1204 another new gNB key ($K_{gNB2*}$) for another target gNB3 1108 of the UE's RNA when UE context information is requested by the other target gNB3 1108. In certain cases, the UE 1102 may want to transition to a connected state on a target gNB2 1106 different from the source gNB1 1104. In such cases, the UE 1102 may perform an RRC resume procedure in a manner similar to that described above in conjunction with FIG. 7. The UE 1102 may also return to the inactive state in a manner similar to that described above in conjunction with FIG. 7.

Figure 13:
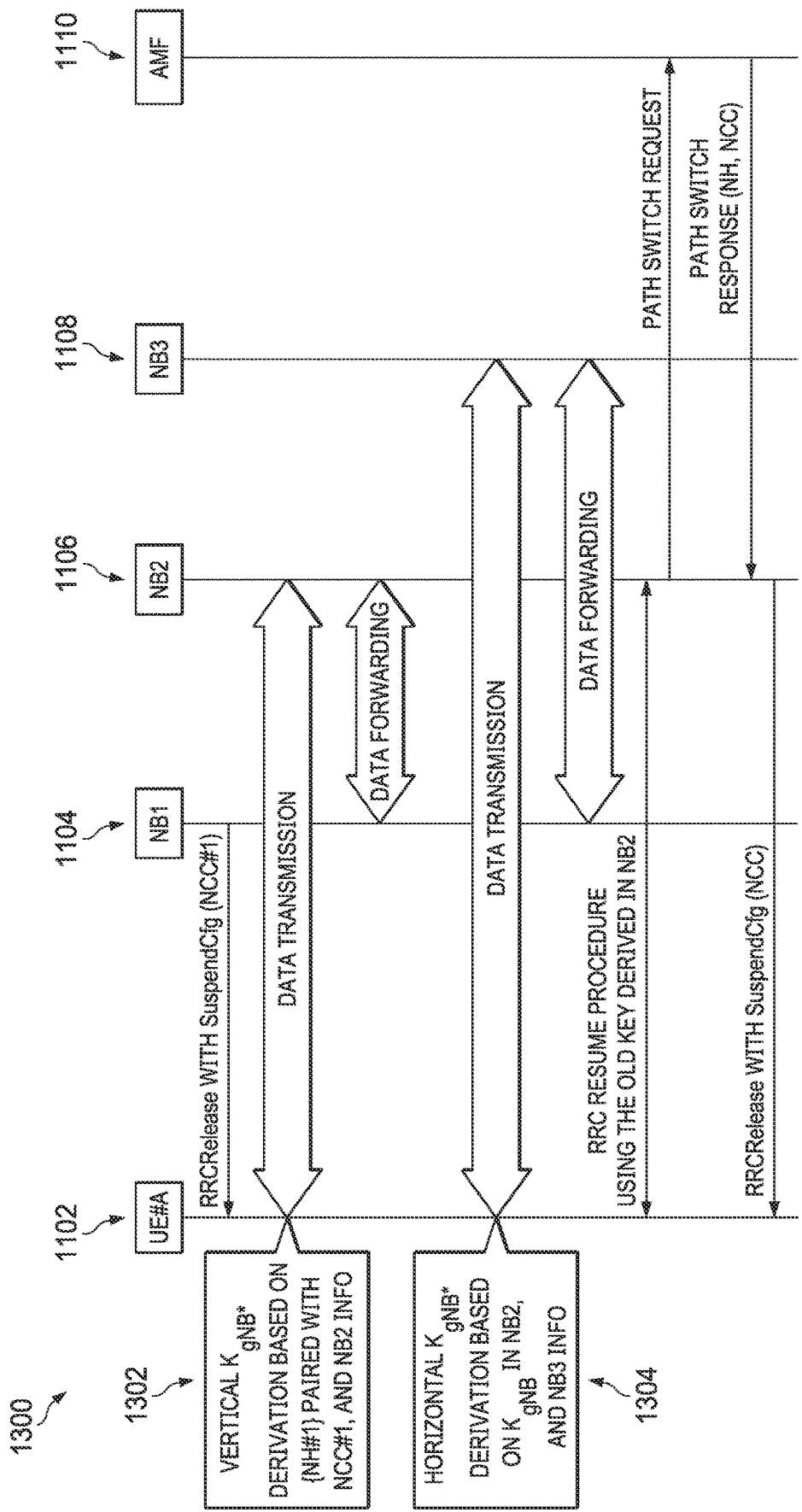

FIG. 13 is a communications flow diagram illustrating a communications flow 1300 for entering and resuming from an RRC inactive state, in accordance with aspects of the present disclosure. The communications flow 1300 illustrates an example corresponding to the fifth option 1010 and where data security is handled by the source gNB, as discussed in conjunction with FIG. 10. In this example, the serving gNB1 1104 receives a first NCC value and NH parameter pair from the AMF (not shown). The serving gNB1 1104 then transmits RRC release message to the UE 1102 with the first NCC value and suspend configuration information including RNA information. After receiving the RRC release message, the UE transitions to the RRC inactive state. When the UE 1102 wants to transmit data in the RRC inactive state, the UE 1102 selects a target gNB, such as target gNB2 1106, and obtains gNB information, broadcast by the target gNB2 1106. The UE 1102 may then vertically derive 1302 a new gNB key ($K_{gNB2*}$) based on the NCC value and the obtained gNB information of the target gNB2 1106. The UE 1102 may then transmit data to the target gNB2 1106 using the vertically derived new gNB key ($K_{gNB2*}$). After the data transmitted by the UE 1102 in the inactive state is received by target gNB2 1106, the target gNB2 1106 forwards the security information along with target gNB information to the source gNB1 1104. The source gNB1 1104 then vertically derives 1212 a new gNB key ($K_{gNB2*}$) based on the target gNB information, the first NCC value, and NH parameter and transmits the derived new gNB key ($K_{gNB2*}$) to the target gNB2 1106. When the UE 1102 transmits data in the RRC inactive state to another target gNB, such as target gNB2 1108, after the initial data transmission, the UE 1102 obtains gNB information, broadcast by the target gNB3 1108 and horizontally derives 1304 a new gNB key ($K_{gNB3*}$) based on the previous gNB key, first NCC value, and gNB information from the target gNB3 1108. After the data transmitted by the UE 1102 in the inactive state is received by target gNB3 1103, the target gNB3 1108 forwards the security information along with target gNB information to the source gNB1 1104. The source gNB1 1104 then horizontally derives a new gNB key ($K_{gNB3*}$) based on the target gNB information, the first NCC value, and NH parameter and transmits the derived new gNB key ($K_{gNB3*}$) to the target gNB2 1106. In certain cases, the UE 1102 may want to transition to a connected state on a target gNB2 1106 different from the source gNB1 1104. In such cases, the UE 1102 may perform an RRC resume procedure using the initially, vertically, derived gNB key ($K_{gNB2*}$), in a manner similar to that described above in conjunction with FIG. 7. The UE 1102 may also return to the inactive state in a manner similar to that described above in conjunction with FIG. 7.

In certain cases, key generation for inactive state data transmissions may be performed using a set of consecutive integer NCC values provided by a source gNB in the RRC release message to generate keys for multiple gNBs. This set of consecutive NCC values may be described by a starting NCC value and an integer, n, indicating how many consecutive NCC values are in the set. In these cases, multiple new gNB values may be derived from the set of NCC values included in the RRC release message. For example, a source gNB may receive, prior to transmitting an RRC release to a UE, a path switch procedure response message including a set of NCC values and NH parameters. The set may include any integer number n, where n>1, of consecutive NCC values. The source gNB may then transmit an RRC release message with suspend configuration information including the set of NCC values. After the UE enters the RCC inactive state, the UE may want to transmit data in the RCC inactive state. The UE may then vertically derive a new gNB key based on a first NCC value from the set of NCC values for the first transmission. The UE may continue to vertically derive a new gNB key based on successive NCC values from the set of NCC values for each data transmission in the RCC inactive state. After n data transmissions the UE will have used all of the NCC values from the set of NCC values.

On the network side, data security handling may be provided by multiple alternative handling procedures. In a first alternative network side data security handling procedure, the data handling security may be performed by the source gNB. For example, in this first alternative, when the data transmitted by the UE in the inactive state to a target gNB, the target gNB forwards the security information of the data transmitted along with target gNB information to the source gNB. The source gNB then returns the gNB key ($K_{gNB}$) to the target gNB. In a second alternative network side data security handling procedure, the data handling security may be performed by each accessed gNB based on NCC/NH pairs broadcast by the source gNB. For example, in this second alternative, the source gNB, after transmitting the RRC release message, including RNA information, to the UE, may broadcast UE context information including the set of NCC values and NH parameter to the other gNBs in the configured RNA of the UE 802. Then, when the UE 802 transmits data to a target gNB, in the inactive state, the target gNB can derived gNB key ($K_{gNB}$). In a third alternative network side data security handling procedure, the data handling security may be performed by each accessed gNB based on UE context data retrieved from the source gNB. For example, in this third alternative, when the data transmitted by the UE in the inactive state to a target gNB, the target gNB forwards the security information of the data transmitted along with target gNB information to the source gNB. The source gNB then returns UE context data including the NCC value and NH parameter to the target gNB. The target gNB can then derive the gNB key ($K_{gNB}$).

Additionally, there may be multiple options for handling subsequent data transmissions after all of the NCC values from the set of NCC values are used. Each of these multiple options may be combined with any of the above detailed alternative network side data security handling procedures.

In a first option, the last gNB key ($N_{gNBn*}$) derived from the set of NCC values may be used to horizontally derive subsequent gNB keys ($N_{gNBn+m*}$) along with gNB information from a target gNB. For example, after all n NCC values in the set of NCC values have been used, the UE may derive a new gNB key ($N_{gNBn+1*}$) by using horizontal derivation based on the currently active (e.g., last) gNB key ($N_{gNBn*}$) derived from the set of NCC values, along with gNB information of the target gNB. For each additional data transmission in the RRC inactive state, additional new gNB keys may continue to be generated using horizontal derivation. On the network side, data security may be performed using any of the above detailed alternative network side data security handling procedures.

In a second option, the last gNB key ($N_{gNBn*}$) derived from the set of NCC values may be reused for subsequent data transmissions in the RRC inactive state. For example, after all n NCC values in the set of NCC values have been used, the UE may continue to use the currently active (e.g., last) gNB key ($N_{gNBn*}$) derived from the set of NCC values for additional data transmission in the RRC inactive state. On the network side, data security may be performed using any of the above detailed alternative network side data security handling procedures.

In a third option, after the NCC values in the set of NCC values have been used a RRC resume procedure may be triggered. For example, after all n NCC values in the set of NCC values have been used, the UE may send a RRC resume procedure to a target gNB. The NCC value used for the RRC resume procedure may either be the last NCC value in the set of NCC values, or there may be a dedicated NCC value for the RCC resume procedure provided with the set of NCC values. The target gNB may then transmit a path switch request to the AMF. The AMF may then respond with a path switch response message including another set of NCC values and a NH parameter. In certain cases, the path switch request procedure may also handover the UE from the previous source gNB to the target gNB. The target gNB may then transmit the other set of NCC values to the UE in an RRC release message.

In a fourth option, after the NCC values in the set of NCC values have been used, additional new gNB keys ($N_{gNBn*}$) may be derived in a manner similar to that described in conjunction with the third option 1006 of FIG. 10 for deriving additional gNB keys from a single NCC value. For example, after all the NCC values in the set of NCC values have been used, a new gNB key ($K_{gNB}$) may be vertically derived based on the currently active (e.g., last) gNB key ($N_{gNBn*}$). NCC value, and gNB information. The UE may then reuse the derived new gNB key ($K_{gNB}$) for each subsequent data transmission.

In a fifth option, after the NCC values in the set of NCC values have been used, additional new gNB keys ($N_{gNBn*}$) may be derived in a manner similar to that described in conjunction with the fourth option 1008 of FIG. 10 for deriving additional gNB keys from a single NCC value. For example, after all the NCC values in the set of NCC values have been used, a new gNB key ($K_{gNB2*}$) may be vertically derived based on the currently active (e.g., last) gNB key ($N_{gNBn*}$), NCC value, and obtained gNB information of the target gNB. For subsequent data transactions, additional new gNB keys ($K_{gNBN*}$) may also be vertically derived based on the currently active gNB key (e.g., $K_{gNB2*}$), NCC value, and obtained gNB information of the target gNB.

In a sixth option, after the NCC values in the set of NCC values have been used, additional new gNB keys ($N_{gNBn*}$) may be derived in a manner similar to that described in conjunction with the sixth option 1010 of FIG. 10 for deriving additional gNB keys from a single NCC value. For example, after all the NCC values in the set of NCC values have been used, a new gNB key ($K_{gNB2*}$) may be vertically derived based on the currently active (e.g., last) gNB key ($N_{gNBn*}$), NCC value and obtained gNB information of the target gNB. For subsequent data transmissions, additional new gNB keys ($K_{gNBN*}$) may be horizontally derived based on the currently active gNB key (e.g., gNB key ($K_{gNB2*}$)).

Figure 14:
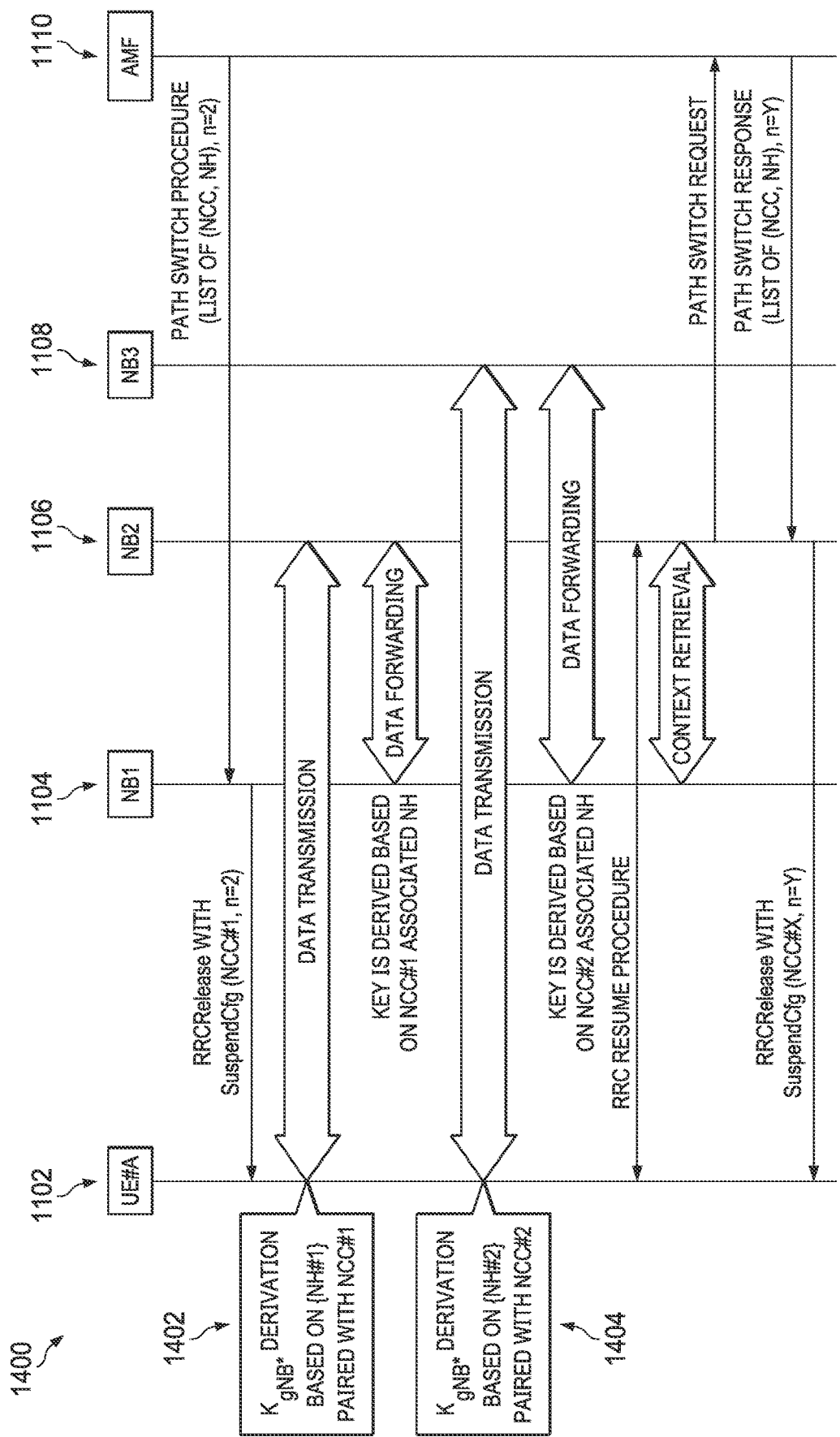

FIG. 14 is a communications flow diagram illustrating an example technique 1400 for key generation for inactive state data transmissions, in accordance with aspects of the present disclosure. The technique 1400 illustrates an example of the third option described above for handling subsequent data transmissions after all of the NCC values from the set of NCC values are used in conjunction with the first alternative network side data security handling procedure. In this example, a source gNB1 1104 may receive from an AMF 1110, prior to transmitting an RRC release to a UE 1102, a path switch procedure response message including a set of NCC values and NH parameter. In this example, the set includes two consecutive NCC values and NH parameters (e.g., n=2). The source gNB1 1104 may then transmit an RRC release message with suspend configuration information including a set of NCC values based on the set of NCC values received from the AMF 1110. After the UE 1102 enters the RCC inactive state, the UE 1102 may want to transmit data in the RCC inactive state. The UE 1102 may then vertically derive 1402 a first gNB key ($K_{gNB2}$) based on a first NCC value from the set of NCC values and gNB information for a first target gNB2 1106 for a first transmission to the first target gNB2 1106, a then forward security information of the first transmission along with gNB information to the source gNB1 1104. The source gNB1 1104 then vertically derives the first gNB key ($K_{gNB2}$) based on the NCC values and NH parameters received from the AMF and the gNB information received from the first target gNB2 1106 and transmits a response back to the first target gNB2 1106 including the first gNB key ($K_{gNB2}$). As the source gNB1 1102 derives each gNB key, the source gNB1 1102 can track NCC value usage and knows which NCC value is currently active. When the UE 1102 wants to transmit additional data in the RRC inactive state, for example, to a second target gNB3 1108, the UE 1102 may vertically derive 1404 a second gNB key ($K_{gNB3}$) based on the next (e.g., last) NCC value from the set of NCC values and gNB information for the second target gNB3 1108 for a second transmission to the second target gNB3 1108. The second target gNB3 1108 may obtain the second gNB key ($K_{gNB3}$) in a way similar to the way the first target gNB2 1106 obtained the first gNB key ($K_{gNB2}$).

After the second transmission, the UE 1102 may perform an RRC resume procedure with, for example, first target gNB2 1106 and transition to an RRC connected mode. In this example, the UE 1102 may use a dedicated NCC value included with the set of NCC values to transmit the RRC resume message. In other cases, the last NCC value of the set of NCC values may be used to transmit the RRC resume message. In certain cases, the RRC resume message may include an indication that additional NCC values for securing additional data transmissions in the RRC inactive mode are needed. The first target gNB2 1106 may then transmit a UE context fetch message to the source gNB1 1104. The source gNB1 1104 may then vertically derives the first gNB key ($K_{gNB2}$) based on NH values received from the AMF and the gNB information received from the first target gNB2 1106. The first target gNB2 1106 may then transmit a path switch request to the AMF 1110. The AMF 1110 may then respond with a path switch response message including another set of NCC values and NH parameter. In certain cases, the path switch request procedure may also handover the UE 1102 from the previous source gNB1 1104 to the first target gNB2 1106. The first target gNB2 1106 may then transmit the other set of NCC values to the UE 1102 in an RRC release message.

Figure 15:
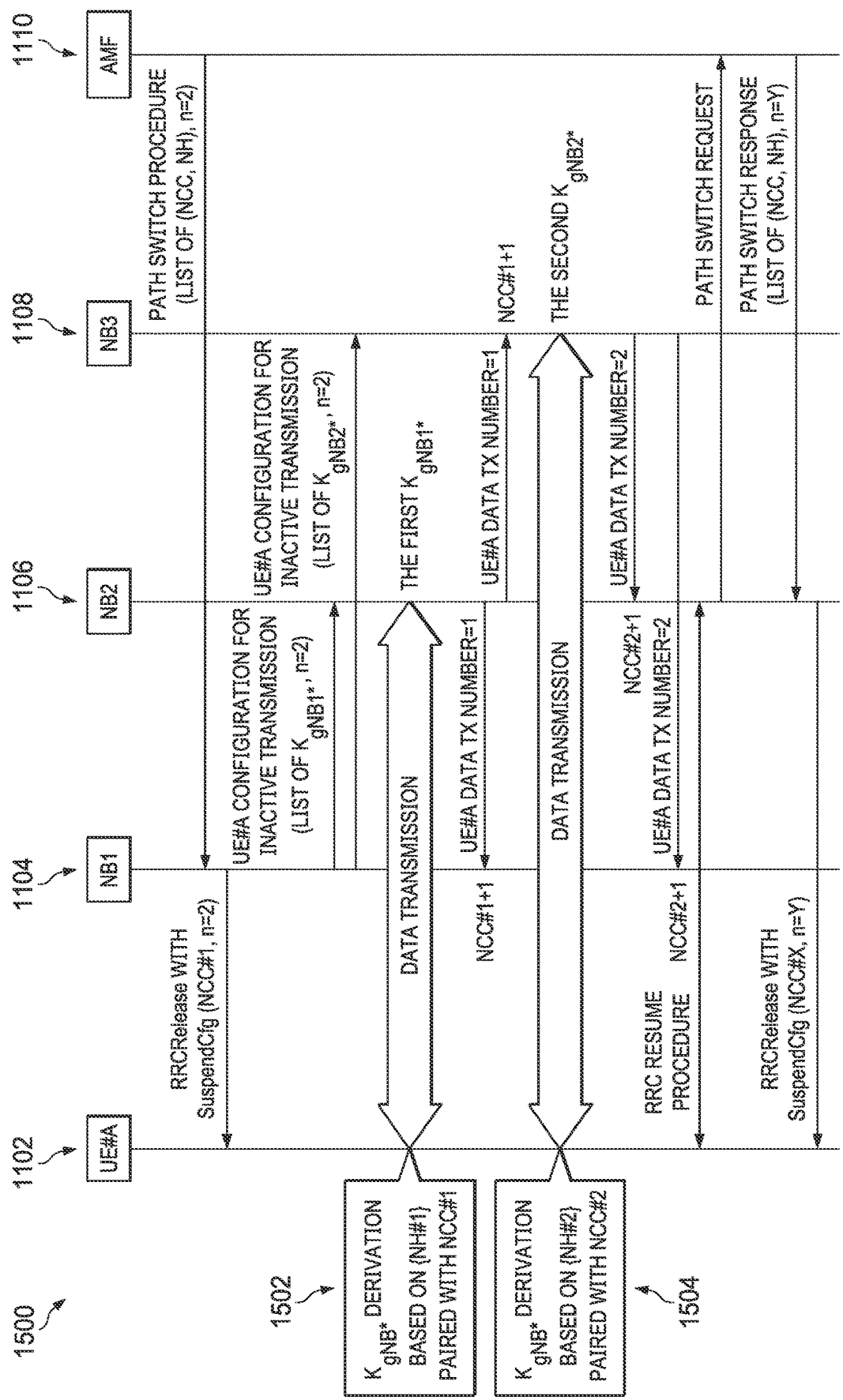

FIG. 15 is a communications flow diagram illustrating an example technique 1500 for key generation for inactive state data transmissions, in accordance with aspects of the present disclosure. The technique 1500 illustrates an example of the third option described above for handling subsequent data transmissions after all of the NCC values from the set of NCC values are used in conjunction with the second alternative network side data security handling procedure. In this example, a source gNB1 1104 may receive from an AMF 1110, prior to transmitting an RRC release to a UE 1102, a path switch procedure response message including a set of NCC values and a NH parameter. In this example, the set includes two NCC values (e.g., n=2). The source gNB1 1104 may then transmit an RRC release message with suspend configuration information including a set of NCC values based on the NCC values received from the AMF 1110. The source gNB1 1104 may broadcast UE context information including the set of NCC values and NH parameter to the other gNBs (e.g., gNB2 1106 and gNB3 1108) in the configured RNA of the UE 1102.

After the UE 1102 enters the RCC inactive state, the UE 1102 may want to transmit data in the RCC inactive state. The UE 1102 may then vertically derive 1502 a first gNB key ($K_{gNB2}$) based on a first NCC value from the set of NCC values and gNB information for a first target gNB2 1106 for a first transmission to the first target gNB2 1106. After receiving the first transmission, the first target gNB2 1106 may also vertically derive the first gNB key ($K_{gNB2}$) based on the set of NCC values and NH parameter broadcast by the source gNB1 1104. The first target gNB2 1106 also broadcasts to the other gNBs (e.g., gNB1 1104 and gNB3 1108) in the configured RNA of the UE 1102 a UE data transmission number indicating which NCC has been used (e.g., an incrementing counter) by the UE 1102. When the UE 1102 wants to transmit additional data in the RRC inactive state, for example, to a second target gNB3 1108, the UE 1102 may vertically derive 1504 a second gNB key ($K_{gNB3}$) based on the next (e.g., last) NCC value from the set of NCC values and gNB information for the second target gNB3 1108 for a second transmission to the second target gNB3 1108. The second target gNB3 1108 may similarly derive the second gNB key ($K_{gNB3}$) based on the set of NCC values broadcast by the source gNB1 1104. The second target gNB3 1108 also broadcasts to the other gNBs (e.g., gNB1 1104 and gNB2 1106) in the configured RNA of the UE 1102 another UE data transmission number indicating which NCC value has been used by the UE 1102.

After the second transmission, the UE 1102 may perform an RRC resume procedure in a manner similar to that described above with respect to FIG. 14. For example, the UE 1102 may use a dedicated NCC value included with the set of NCC values to transmit the RRC resume message. In other cases, the last NCC value of the set of NCC values may be used to transmit the RRC resume message. In certain cases, the RRC resume message may include an indication that additional NCC values for securing additional data transmissions in the RRC inactive mode are needed. The first target gNB2 1106 may then transmit a UE context fetch message to the source gNB1 1104. The source gNB1 1104 may then vertically derives the first gNB key ($K_{gNB2}$) based on the NH parameter received from the AMF and the gNB information received from the first target gNB2 1106. The first target gNB2 1106 may then transmit a path switch request to the AMF 1110. The AMF 1110 may then respond with a path switch response message including another set of NCC values and NH parameter. In certain cases, the path switch request procedure may also handover the UE 1102 from the previous source gNB1 1104 to the first target gNB2 1106. The first target gNB2 1106 may then transmit the other set of NCC values to the UE 1102 in an RRC release message.

Figure 16:
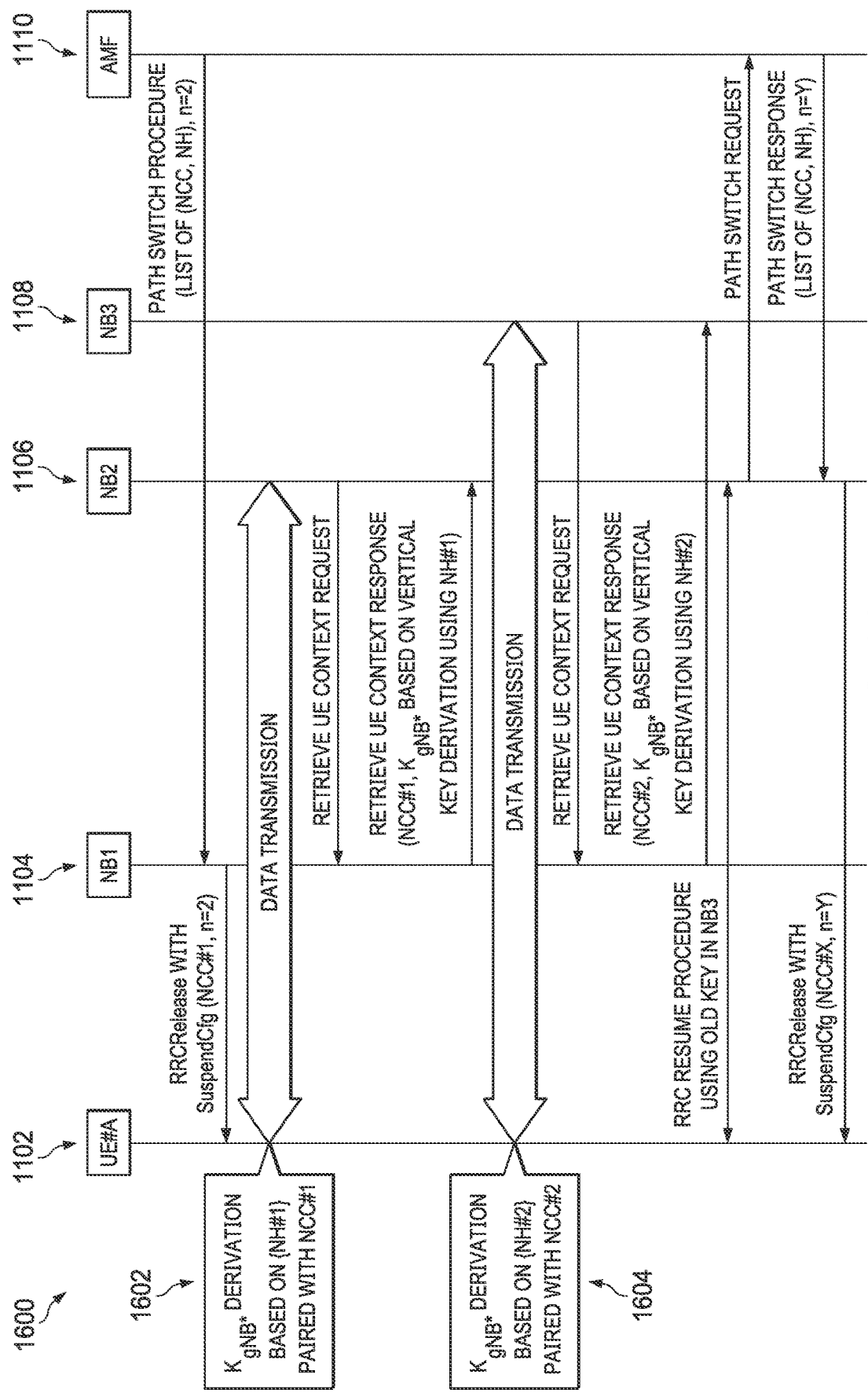

FIG. 16 is a communications flow diagram illustrating an example technique 1600 for key generation for inactive state data transmissions, in accordance with aspects of the present disclosure. The technique 1600 illustrates an example of the third option described above for handling subsequent data transmissions after all of the NCC values from the set of NCC values are used in conjunction with the third alternative network side data security handling procedure. In this example, a source gNB1 1104 may receive from an AMF 1110, prior to transmitting an RRC release to a UE 1102, a path switch procedure response message including a set of NCC values and NH parameter. In this example, the set includes two NCC values (e.g., n=2). The source gNB1 1104 may then transmit an RRC release message with suspend configuration information including a set of two NCC values based on NCC values received from the AMF 1110. After the UE 1102 enters the RCC inactive state, the UE 1102 may want to transmit data in the RCC inactive state. The UE 1102 may then vertically derive 1602 a first gNB key ($K_{gNB2}$) based on a first NCC value from the et of NCC values and gNB information for a first target gNB2 1106 for a first transmission to the first target gNB2 1106. After receiving the first transmission, the first target gNB2 1106 transmits a UE context fetch message to the source gNB1 1104 and the source gNB1 1104 responds by returning a UE context response message including the next NCC value and NH parameter. As a UE context is accessed by the source gNB1 1104 each time another gNB receives a data transmission from the UE 1102, the source gNB1 1104 can track NCC value usage and knows which NCC value is currently active. The first target gNB2 1106 may then vertically derive the first gNB key ($K_{gNB2}$) based on the next NCC value, NH parameter, and gNB information. When the UE 1102 wants to transmit additional data in the RRC inactive state, for example, to a second target gNB3 1108, the UE 1102 may vertically derive 1604 a second gNB key ($K_{gNB3}$) based on the last NCC value from the set of NCC values and gNB information for the second target gNB3 1108 for a second transmission to the second target gNB3 1108. The second target gNB3 1108 also transmits a UE context fetch message to the source gNB1 1104 and the source gNB1 1104 responds by returning a UE context response message including the next NCC value and NH parameter. The second target gNB3 1108 may then vertically derive the first gNB key ($K_{gNB2}$) based on the next NCC value, NH parameter, and gNB information. After the second transmission, the UE 1102 may perform an RRC resume procedure in a manner similar to that described above with respect to FIG. 14.

Figure 17:
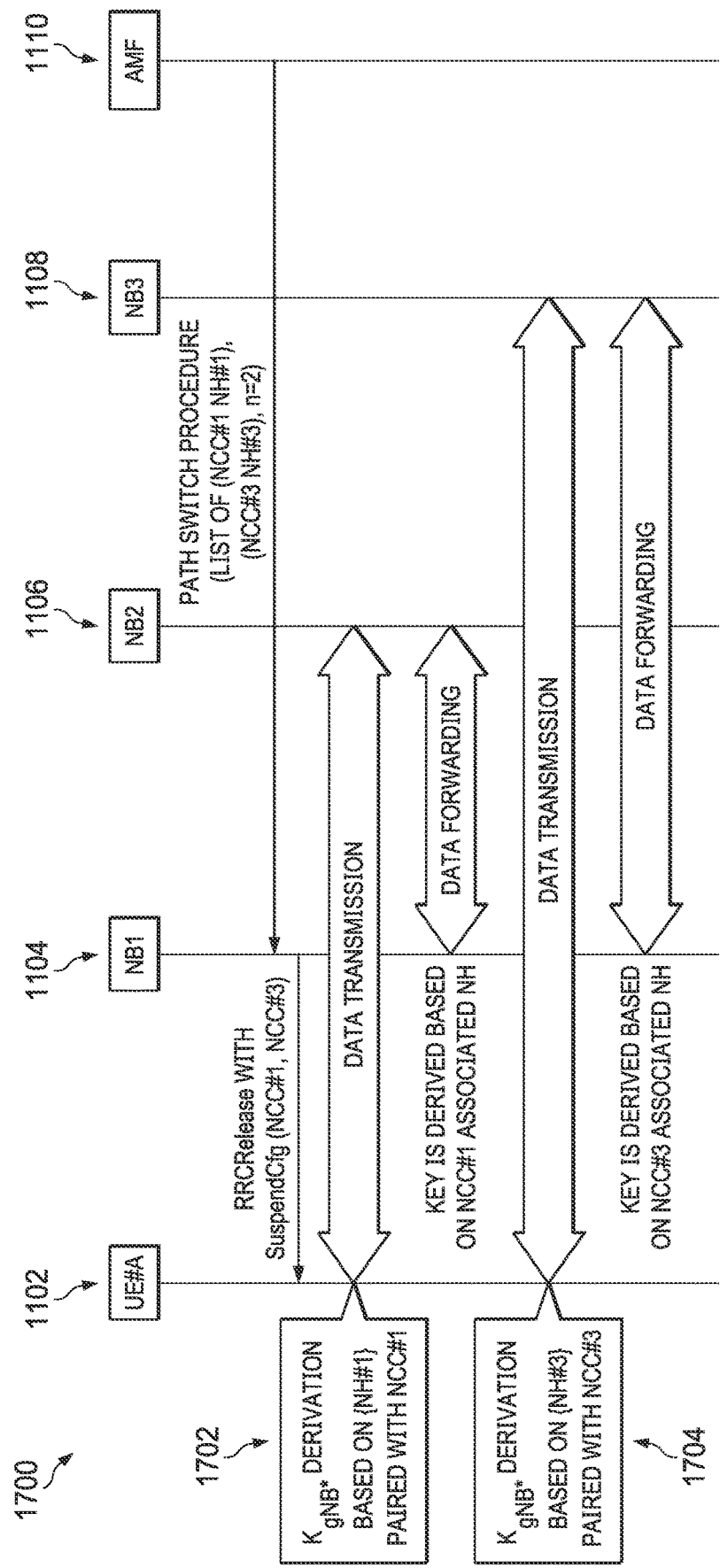

FIG. 17 is a communications flow diagram illustrating an example technique 1700 for key generation for inactive state data transmissions, in accordance with aspects of the present disclosure. The technique 1700 illustrates an example using a list of non-consecutive NCC values. The technique 1700 is a variant of using a set of consecutive integer NCC values and all options and alternative network side data security handling procedure described with respect to the set of consecutive integer NCC values may also apply to variants using a list of non-consecutive NCC values. For example, the technique 1700 shows operations with a non-consecutive listing of NCC values used in conjunction with the first alternative network side data security handling procedure and omits details regarding handling subsequent data transmissions after all of the NCC values from the list of NCC values are used. It may be understood that all options for handing subsequent data transmissions after all of the NCC values from the list of NCC values and the other alternative network side data security handing and may also be combined with the non-consecutive listing of NCC values. Instead of describing a set of consecutive NCC values using a starting NCC value and an integer, the set of NCC values may be a non-consecutive listing of NCC values and NH parameter pairs. Operations using the list of NCC values to derive gNB keys are substantially similar, on both the UE and network side, as described above with respect to the set of consecutive NCC values. As compared to operations with the set of consecutive NCC values, operations with a non-consecutive listing of NCC values would operate with specific NCC values rather than a starting NCC value that consecutively increases. For example, in technique 1700, a source gNB1 1104 may receive from an AMF 1110, prior to transmitting an RRC release to a UE 1102, a path switch procedure response message including a list of NCC values and NH parameter pairs (e.g., ((NCC1, NH1), (NCC3, NH3) . . . )). The source gNB1 1104 may then transmit an RRC release message to the UE 1102 with suspend configuration information including the list of NCC values. After the UE 1102 enters the RCC inactive state, the UE 1102 may want to transmit data in the RCC inactive state. The UE 1102 may then vertically derive 1702 a first gNB key ($K_{gNB2}$) based on a first NCC value (NCC1) from the set of NCC values and gNB information for a first target gNB2 1106 for a first transmission to the first target gNB2 1106. After receiving the first transmission, the first target gNB2 1106 may then forward security information of the first transmission along with gNB information to the source gNB11104. The source gNB1 1104 then vertically derives the first gNB key ($K_{gNB2}$) based on NCC values and NH parameters received from the AMF and the gNB information received from the first target gNB2 1106 and transmits a response back to the first target gNB2 1106 including the first gNB key ($K_{gNB2}$). When the UE 1102 wants to transmit additional data in the RRC inactive state, for example, to a second target gNB3 1108, the UE 1102 may vertically derive 1704 a second gNB key ($K_{gNB3}$) based on the next (e.g., last) NCC value (e.g., NCC3) from the list of NCC values and gNB information for the second target gNB3 1108 for a second transmission to the second target gNB3 1108. The second target gNB3 1108 may obtain the second gNB key ($K_{gNB3}$) in a way similar to the way the first target gNB2 1106 obtained the first gNB key ($K_{gNB2}$).

Figure 18:
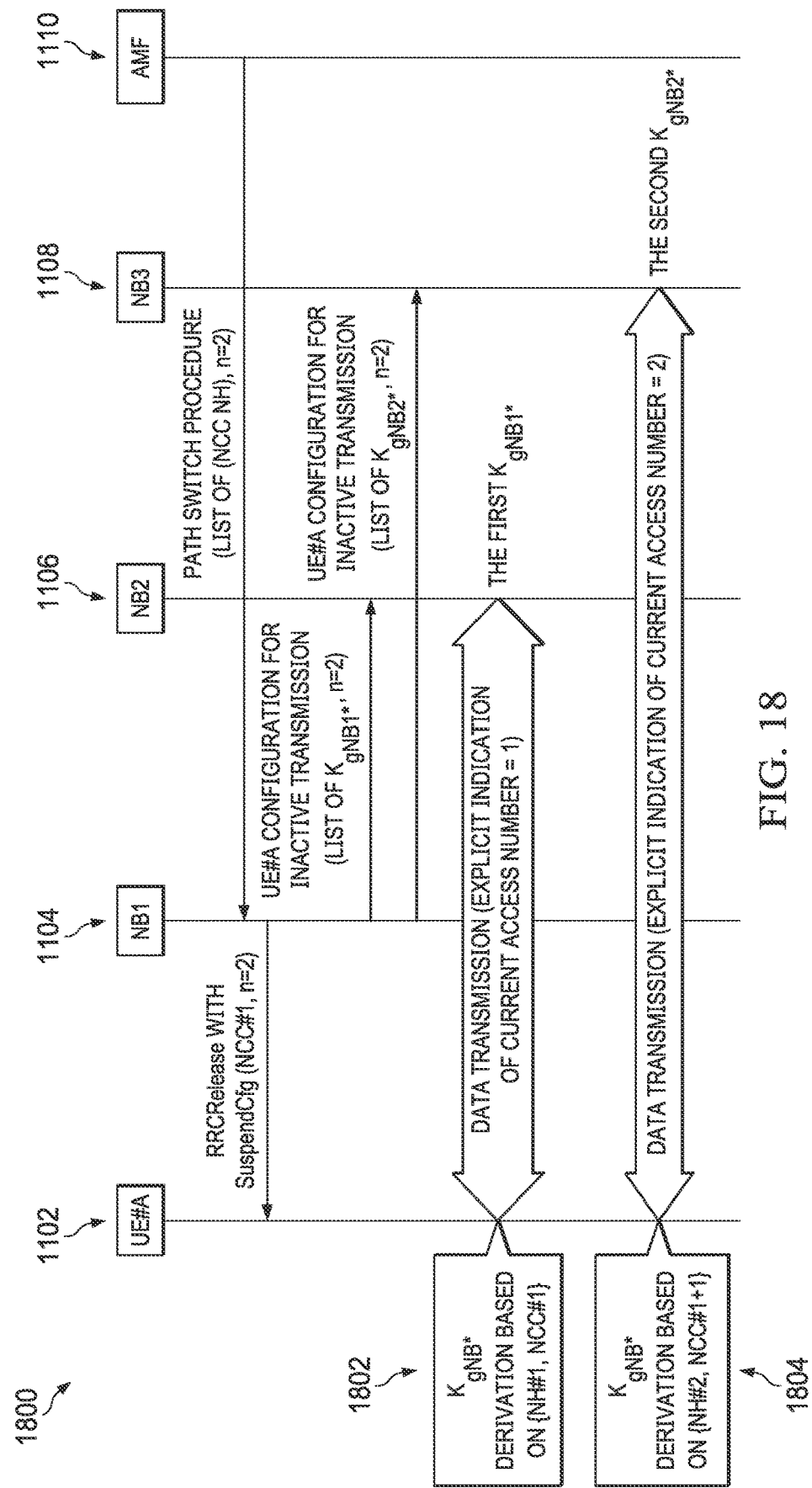

FIG. 18 is a communications flow diagram illustrating an example technique 1800 for key generation for inactive state data transmissions, in accordance with aspects of the present disclosure. The technique 1800 is a variant of other example techniques using a set of consecutive integer NCC values whereby the UE includes an indication of which NCC value is currently active, such as by using a incrementing counter. It should be understood that all options and alternative network side data security handling procedure described with respect to the set of consecutive integer NCC values may also apply to technique 1800. For example, the technique 1800, as shown, applies the second alternative network side data security handling procedure and omits details regarding handling subsequent data transmissions after all of the NCC values from the list of NCC values are used. It may be understood that all options for handing subsequent data transmissions after all of the NCC values from the list of NCC values and the other alternative network side data security handing and may also be combined with the non-consecutive listing of NCC values. In this example, a source gNB1 1104 may receive from an AMF 1110, prior to transmitting an RRC release to a UE 1102, a path switch procedure response message including a set of NCC values and a NH parameter. In this example, the set includes two NCC values (e.g., n=2). The source gNB1 1104 may then transmit an RRC release message with suspend configuration information including a set of NCC values based on the NCC values received from the AMF 1110. The source gNB1 1104 may broadcast UE context information including the set of NCC values and NH parameters to the other gNBs (e.g., gNB2 1106 and gNB3 1108) in the configured RNA of the UE 1102.

After the UE 1102 enters the RCC inactive state, the UE 1102 may want to transmit data in the RCC inactive state. The UE 1102 may then vertically derive 1802 a first gNB key ($K_{gNB2}$) based on a first NCC value from the set of NCC values and gNB information for a first target gNB2 1106 for a first transmission to the first target gNB2 1106. Included with the first transmission is a first indication of the current NCC access number. After receiving the first transmission, the first target gNB2 1106 may also vertically derive the first gNB key ($K_{gNB2}$) based on the set of NCC values, the indication of the current NCC access number, and NH parameter broadcast by the source gNB1 1104. When the UE 1102 wants to transmit additional data in the RRC inactive state, for example, to a second target gNB3 1108, the UE 1102 may vertically derive 1804 a second gNB key ($K_{gNB3}$) based on the next (e.g., last) NCC value from the set of NCC values and gNB information for the second target gNB3 1108 for a second transmission to the second target gNB3 1108. Included with the second transmission is a second indication of the current NCC access number, the second indication different from the first indication (e.g., incremented). The second target gNB3 1108 may similarly derive the second gNB key ($K_{gNB3}$) based on the set of NCC values broadcast by the source gNB1 1104 and the second indication of the current NCC access number.

Figure 19:
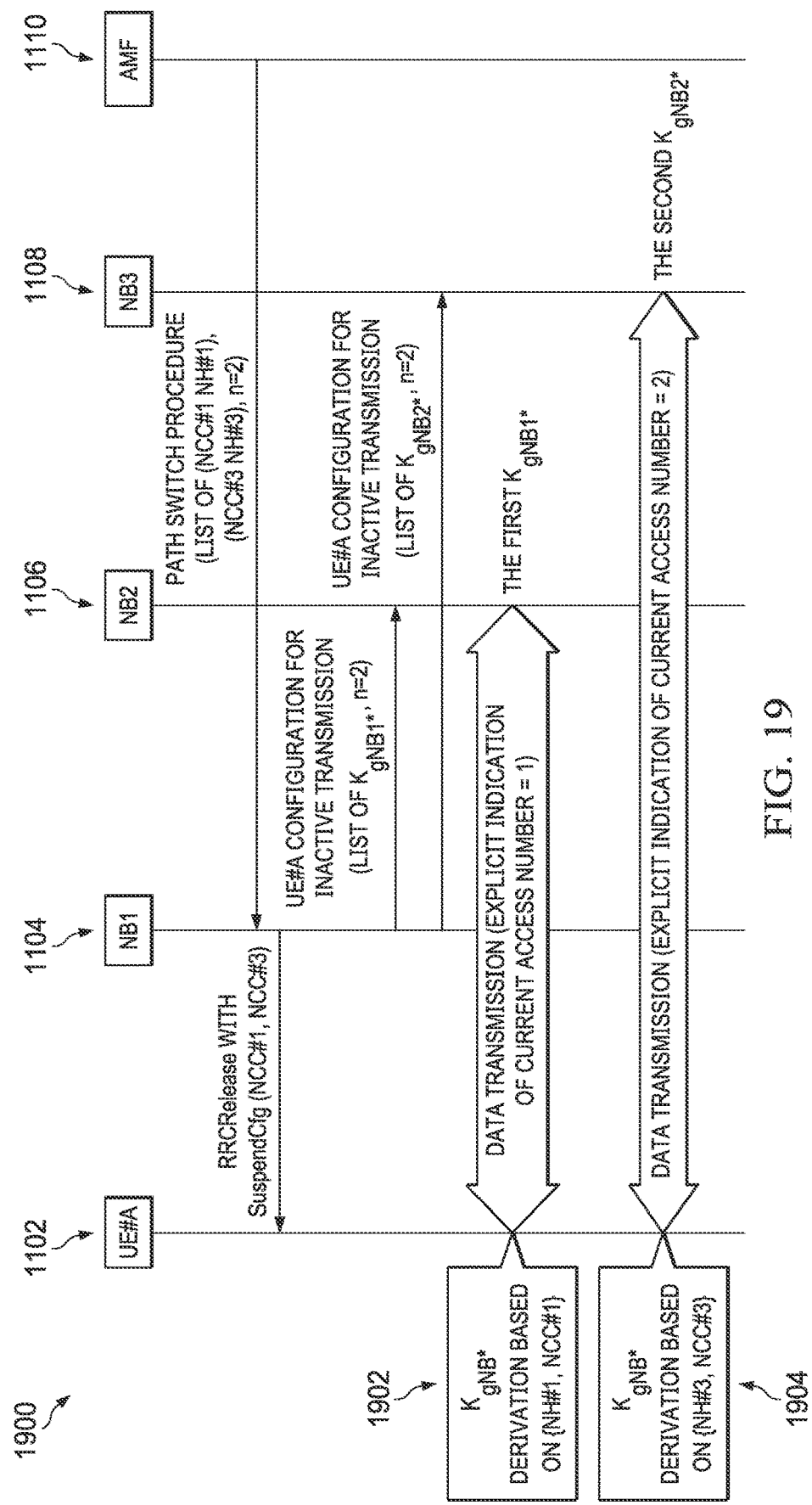

FIG. 19 is a communications flow diagram illustrating an example technique 1900 for key generation for inactive state data transmissions, in accordance with aspects of the present disclosure. The technique 1900 is an example variant of using a list of non-consecutive NCC values whereby the UE includes an indication of which NCC value is currently active, such as by using an incrementing counter. It should be understood that all options and alternative network side data security handling procedure described with respect to the set of consecutive integer NCC values may also apply to technique 1900. For example, the technique 1900, as shown, applies the second alternative network side data security handling procedure and omits details regarding handling subsequent data transmissions after all of the NCC values from the list of NCC values are used. It may be understood that all options for handing subsequent data transmissions after all of the NCC values from the list of NCC values and the other alternative network side data security handing and may also be combined with the non-consecutive listing of NCC values. For example, in technique 1900, a source gNB1 1104 may receive from an AMF 1110, prior to transmitting an RRC release to a UE 1102, a path switch procedure response message including a list of NCC values and NH parameter pairs (e.g., ((NCC1, NH1), (NCC3, NH3) . . . )). The source gNB1 1104 may then transmit an RRC release message to the UE 1102 with suspend configuration information including the list of NCC values. The source gNB1 1104 may broadcast UE context information including the list of NCC values and NH parameters to the other gNBs (e.g., gNB2 1106 and gNB3 1108) in the configured RNA of the UE 1102.

After the UE 1102 enters the RCC inactive state, the UE 1102 may want to transmit data in the RCC inactive state. The UE 1102 may then vertically derive 1902 a first gNB key ($K_{gNB2}$) based on a first NCC value (NCC1) from the set of NCC values and gNB information for a first target gNB2 1106 for a first transmission to the first target gNB2 1106. Included with the first transmission is a first indication of the current NCC access number. After receiving the first transmission, the first target gNB2 1106 may also vertically derive the first gNB key ($K_{gNB2}$) based on the list of NCC values, the indication of the current NCC access number, and NH parameter broadcast by the source gNB11104. When the UE 1102 wants to transmit additional data in the RRC inactive state, for example, to a second target gNB3

1108, the UE 1102 may vertically derive 1904 a second gNB key ($K_{gNB3}$) based on the next (e.g., last) NCC value from the list of NCC values and gNB information for the second target gNB3 1108 for a second transmission to the second target gNB3 1108. Included with the second transmission is a second indication of the current NCC access number, the second indication different from the first indication (e.g., incremented). The second target gNB3 1108 may similarly derive the second gNB key ($K_{gNB3}$) based on the list of NCC values broadcast by the source gNB1 1104 and the second indication of the current NCC access number.

Figure 20:
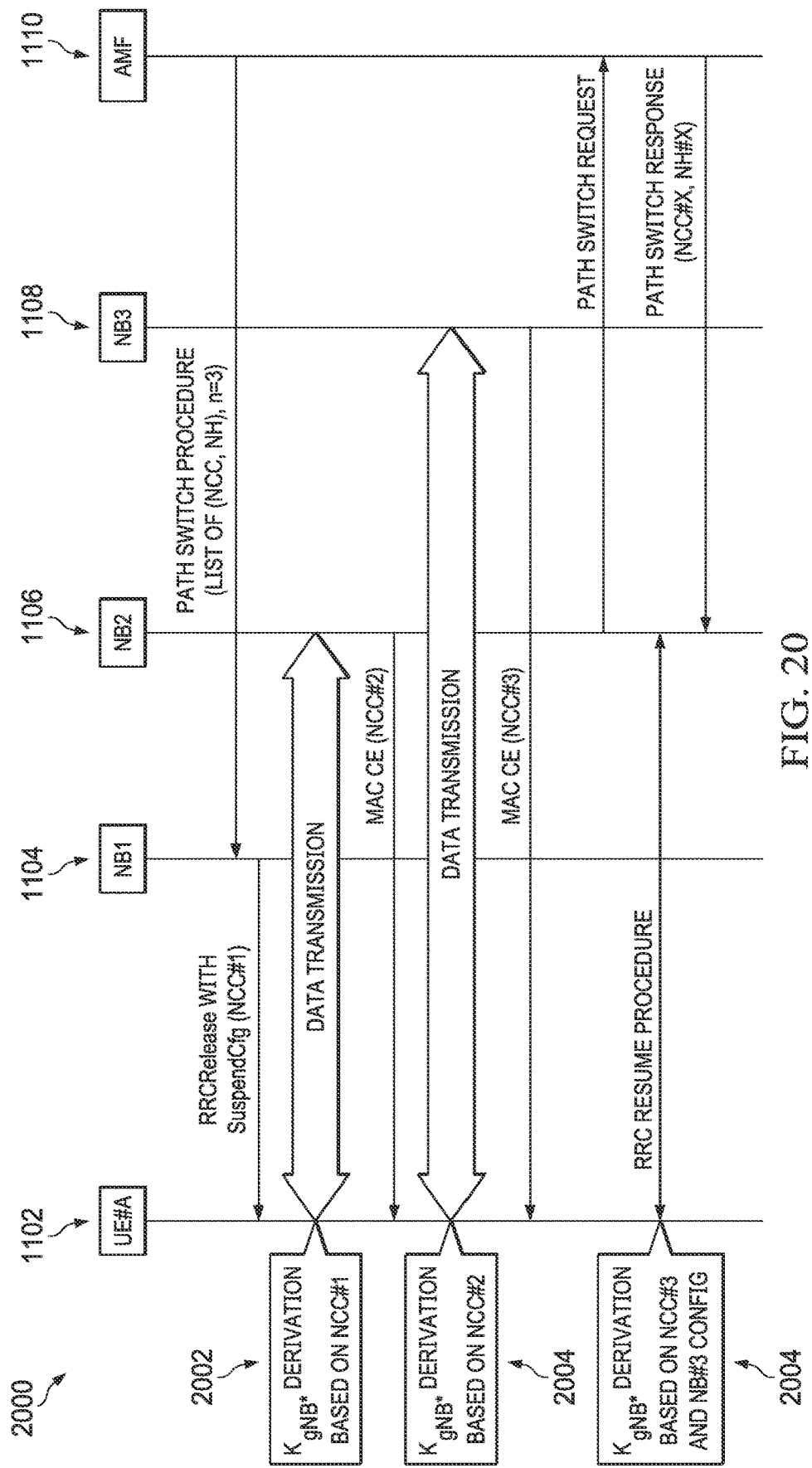

In certain cases, key generation for inactive state data transmissions may be performed using a set of NCC values and NH parameters, where the NCC values for a next transmission in an RRC inactive state are provided to a UE. FIG. 20 is a communications flow diagram illustrating an example technique 2000 for key generation for inactive state data transmissions, in accordance with aspects of the present disclosure. The technique 2000 illustrates an example of where the NCC values for a next transmission in an RRC inactive state are provided to a UE. In this example, a source gNB1 1104 may receive, prior to transmitting an RRC release to a UE, a path switch procedure response message including a set of NCC values and NH parameters. The set, in a first option, may include multiple NCC values and NH parameters. These multiple NCC values and NH parameters may be consecutive NCC values described by a starting NCC value and an integer, n, indicating how many consecutive NCC values are in the set, or the set may be a listing of multiple, non-consecutive NCC values. The set, in a second option, may include a single NCC value and NH parameter pair. In the second option, each subsequent gNB which receives a data transmission from the UE 1102, while in the RRC inactive state, requests from the CN, such as the AMF 1110, a new NCC value (NCC1) and NH parameter pair for use in the next transmission in the RRC inactive state. In either option, the source gNB1 1104 may then transmit an RRC release message with suspend configuration information including a first NCC value (NCC1) and RNA information to the UE 1102. The UE 1102 may enter the RRC inactive state. The UE 1102 may want to transmit, in the RRC inactive state, a first transmission to a first target gNB2 1106 and may vertically derive 2002 a new first gNB key ($K_{gNB2}$) based at least in part on the single NCC value (NCC1) sent to the UE 1102 by the source gNB1 1104. After receiving the first transmission, the first target gNB2 1106 may perform an alternative network side data security handling procedure discussed below. Additionally, the first target gNB2 1106 may obtain a next second NCC value (NCC2) and NH parameter. The first target gNB2 1106 may provide the next second NCC value (NCC2) to the UE 1102 by using, for example, a medium access control (MAC) control element (MAC-CE), radio link control (RLC) control packet data unit (PDU), or Packet Data Convergence Protocol (PDCP) control PDU signaling. The UE 1102 may further want to transmit, in the RRC inactive state, a second transmission to a second target gNB3 1108 and may vertically derive 2004 a new second gNB key ($K_{gNB3}$) based at least in part on the next second NCC value (NCC2) sent to the UE 1102 by the first target gNB2 1106. After receiving the first transmission, the second target gNB3 1108 may also perform an alternative network side data security handling procedure discussed below. Additionally, the second target gNB3 1108 may obtain a next third NCC value (NCC3) and NH parameter. The second target gNB3 1108 may provide the next third NCC value (NCC3) to the UE 1102 by using, for example, MAC-CE, RLC control PDU, or PDCP control PDU signaling. The UE 1102 may perform an RRC resume procedure with, for example, first target gNB2 1106 and transition to an RRC connected mode. In this example, the UE 1102 may derive 2006 a new third gNB key ($K_{gNB3*}$) based on the third NCC value (NCC3), NH parameter, and/or gNB information for the previously serving gNB3 1108 to transmit the RRC resume message. The first target gNB2 1106 may then transmit a path switch request to the AMF 1110. The AMF 1110 may then respond with a path switch response message including another set of NCC values and NH parameter. In certain cases, the path switch request procedure may also handover the UE 1102. The first target gNB2 1106 may then transmit the other set of NCC values to the UE 1102 in an RRC release message.

On the network side, in either option, network side data security handling may be provided by multiple alternative handling procedures. In a first alternative, the data handling security may be performed by the source gNB. This first alternative may be combined with the first option. In this first alternative combined with the first option, after the first transmission to the first target gNB2 1106 is received, the first target gNB2 1106 forwards the security information of the first transmission along with first target gNB2 1106 information to the source gNB1 1104. The source gNB1 1104 then vertically derives 2002 the new first gNB key ($K_{gNB2}$) based on the set of NCC values and the first target gNB2 1106 information and returns the new first gNB key ($K_{gNB2}$) to the first target gNB2 1106. Similarly, after a second transmission to a second target gNB3 1108 is received, the second target gNB3 1108 also forwards the security information of the second transmission along with second target gNB3 1108 information to the source gNB1 1104. The source gNB1 1104 may then vertically 2004 derive the new second gNB key ($K_{gNB3}$) based on the set of NCC values and the second target gNB3 1108 information and returns the new second gNB key ($K_{gNB3}$) to the second target gNB3 1108.

This first alternative may also be combined with the second option with certain modifications as compared to the combination with the first option. In this combination, the after the first transmission to the first target gNB2 1106 is received, the first target gNB2 1106 forwards the security information of the first transmission along with first target gNB2 1106 information to the source gNB1 1104. The source gNB1 1104 then vertically derives 2002 the new first gNB key ($K_{gNB2}$) based on the NCC value (NCC1) and the first target gNB2 1106 information and returns the new first gNB key ($K_{gNB2}$) to the first target gNB2 1106. The first target gNB2 1106 then connects to the CN, such as the AMF 1110 and obtains a next second NCC value (NCC2) and NH parameter. The target gNB2 1106 then provides the next second NCC value (NCC2) to the UE 1102 by using, for example, a MAC-CE, RLC control PDU, or PDCP control PDU signaling. The target gNB2 1106 may then broadcast an indication to the other gNBs (e.g., gNB1 1104 and gNB3 1108) in the UE's RNA that the target gNB2 1106 has the next second NCC value (NCC2). After the second transmission to second target gNB3 1108 is received, the second target gNB3 1108 forwards the security information of the second transmission along with second target gNB3 1108 information to the first target gNB2 1106 based on the broadcasted indication. The first target gNB2 1106 may then vertically derive 2004 the new second gNB key ($K_{gNB3}$) based on a now current second NCC value (NCC2), NH parameter received from the CN, and the second target gNB3 1108 information. The first target gNB2 1106 then returns the new second gNB key ($K_{gNB3}$) to the second target gNB3 1108. The second target gNB3 1108 then obtains a next third NCC value (NCC3) and NH parameter from the CN. The second target gNB3 1108 then provides the next third NCC value (NCC3) to the UE 1102 again using, for example, a MAC-CE, RLC control PDU, or PDCP control PDU signaling. The second target gNB3 1108 may also then broadcast an indication to the other gNBs (e.g., gNB1 1104 and gNB2 1106) in the UE's RNA that the second target gNB3 1108 has the next third NCC value (NCC3).

In a second alternative network side data security handling procedure, the data handling security may be performed by each accessed gNB based on NCC/NH pairs broadcast by the source gNB. This second alternative may be combined with either the first option or the second option in substantially the same way. In this second alternative, the source gNB1 1104 may broadcast UE 1102 context information including the set of NCC values (or single NCC value for option 2) and NH parameter to the other gNBs (e.g., gNB2 1106 and gNB2 1108) in the configured RNA of the UE 1102. After the UE 1102 enters the RCC inactive state, the UE 1102 may want to transmit data in the RCC inactive state. The UE 1102 may then vertically derive 2002 a first gNB key ($K_{gNB2}$) based on the first NCC value (NCC1) received from the source gNB1 1104 and transmit a first transmission, in the RRC inactive state, to the first target gNB2 1106. The first target gNB2 1106 may derive the first gNB key ($K_{gNB2}$) based on the first NCC value (NCC1) and NH parameter broadcast by the source gNB1 1104. The first target gNB2 1106 may also broadcasts to the other gNBs (e.g., gNB1 1104 and gNB3 1108) in the configured RNA of the UE 1102 a UE data transmission number indicating which NCC has been used (e.g., an incrementing counter) by the UE 1102. The first target gNB2 1106 may also obtain a next second NCC value (NCC2) either via the set of NCC values transmitted by the source gNB1 1104 (e.g., for option 1) or connects to the CN, such as the AMF 1110 and obtains the next second NCC value (NCC2) and NH parameter (e.g., for option 2). The first target gNB2 1106 then provides the next second NCC value (NCC2) to the UE 1102 by using, for example, a MAC-CE, RLC control PDU, or PDCP control PDU signaling. The first target gNB2 1106 may (e.g., for option 2) broadcast the NCC value and NH parameter obtained from the CN to the other gNBs (e.g., gNB1 1104 and gNB3 1108) in the configured RNA of the UE 1102. If the UE 1102 wants to transmit more data in the RCC inactive state, the UE 1102 may vertically derive 2004 a second gNB key ($K_{gNB2}$) based on the second NCC value (NCC2) received from the first target gNB2 1106 and transmit a second transmission, in the RRC inactive mode, to second target gNB3 1108. After the second transmission to second target gNB3 1108 is received from the UE 1102, the second target gNB3 1108 may vertically derive the second gNB key ($K_{gNB2}$) based on the second NCC value (NCC2) and NH parameter broadcast by the source gNB1 1104 (e.g., for option 1), or based on the second NCC value (NCC2) and NH parameter broadcast by the first target gNB2 1106 (e.g., for option 2). The second target gNB3 1108 may also obtain a next third NCC value (NCC3) either via the set of NCC values transmitted by the source gNB1 1104 (e.g., for option 1) or connect to the CN, such as the AMF 1110 and obtain the next third NCC value (NCC3) and NH parameter (e.g., for option 2). The second target gNB3 1108 then provides the next second NCC value (NCC2) to the UE 1102 by using, for example, a MAC-CE, RLC control PDU, or PDCP control PDU signaling. The third target gNB3 1108 may (e.g., for option 2) broadcast the NCC value and NH parameter obtained from the CN to the other gNBs (e.g., gNB1 1104 and gNB2 1106) in the configured RNA of the UE 1102. The second target gNB3 1108 may also broadcast to the other gNBs (e.g., gNB1 1104 and gNB2 1106) in the configured RNA of the UE 1102 another UE data transmission number indicating which NCC value has been used by the UE 1102.

In a third alternative, the data handling security may be performed by each accessed gNB based on UE context data retrieved from the source gNB. This third alternative may be combined with the first option. In this third alternative, with the first option, after the data transmission by the UE 1102 in the inactive state to a first target gNB2 1106, the first target gNB2 1106 requests UE context data from the source gNB1 1104. The source gNB1 1104 then returns UE context data including at least the first NCC value (NCC1) and NH parameter to the first target gNB2 1106. The first target gNB2 1106 can then vertically derive 2002 the first gNB key ($K_{gNB2}$) based on the first NCC value (NCC1) and NH parameter. Similarly, after a second transmission to a second target gNB3 1108 is received, the second target gNB3 1108 also requests UE context data from the source gNB1 1104. The source gNB1 1104 then returns UE context data including at least the second NCC value (NCC2) and NH parameter to the second target gNB3 1108. The second target gNB3 1108 can then vertically derive 2004 the second gNB key ($K_{gNB3}$) based on the second NCC value (NCC2) and NH parameter received from the source gNB1 1104.

This third alternative may also be combined with the second option with certain modifications as compared to the combination with the first option. In this combination, the after the first transmission to the target gNB2 1106 is received, the target gNB2 1106 requests UE context data from the source gNB1 1104. The source gNB1 1104 then returns UE context data including the first NCC value (NCC1) and NH parameter to the first target gNB2 1106. The first target gNB2 1106 then connects to the CN, such as the AMF 1110 and obtains a second NCC value (NCC2) and NH parameter. The target gNB2 1106 then provides the second NCC value (NCC2) to the UE 1102 by using, for example, a MAC-CE, RLC control PDU, or PDCP control PDU signaling. The first target gNB2 1106 may then broadcast an indication to the other gNBs (e.g., gNB1 1104 and gNB3 1108) in the UE's RNA that the first target gNB2 1106 has the next second NCC value (NCC2). After the second transmission to second target gNB3 1108 is received, the second target gNB3 1108 requests UE context data from the first target gNB2 1106 based on the broadcasted indication. The first target gNB2 1106 then returns UE context data including the second NCC value (NCC2) and NH parameter to the second target gNB3 1108. The second target gNB3 1108 may then vertically derive 2004 the new second gNB key ($K_{gNB3}$) based on a now current second NCC value (NCC2) and NH parameter received from the first gNB2 1106. The second target gNB3 1108 then obtains a next third NCC value (NCC3) and NH parameter from the CN. The second target gNB3 1108 then provides the next third NCC value (NCC3) to the UE 1102 again using, for example, a MAC-CE, RLC control PDU, or PDCP control PDU signaling. The second target gNB3 1108 may also then broadcast an indication to the other gNBs (e.g., gNB1 1104 and gNB2 1106) in the UE's RNA that the second target gNB3 1108 has the next third NCC value (NCC3).

Figure 21:
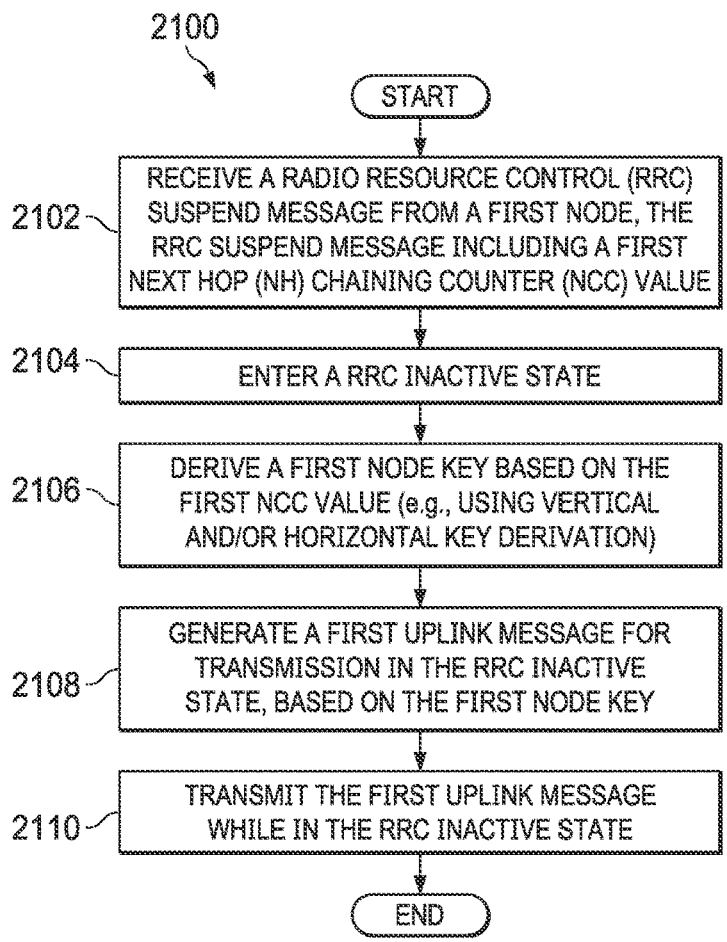
FIG. 21 is a flow diagram illustrating a technique for key generation by a user device for inactive state data transmissions, in accordance with aspects of the present disclosure.

FIG. 21 is a flow diagram illustrating a technique 2100 for key generation by a user device for inactive state data transmissions, in accordance with aspects of the present disclosure. At block 2102 a radio resource control (RRC) suspend message may be received from a first node, the RRC suspend message including a next hop (NH) chaining counter (NCC) value. At block 2104, an RRC inactive state may be entered. At block 2106, a first node key may be derived based on the first NCC value. It may be understood that a node key, as used herein, refers to a derived key that may be used to access a cell, such as a gNB cell, eNB cell, small cell, etc. As examples, the first node key may be based on a previously used node key, a horizontally derived node key, or a vertically derived node key. At block 2108, a first uplink message may be generated for transmission in the RRC inactive state, based on the first node key. At block 2110, the first uplink message may be transmitted to a node while in the RRC inactive state. As may be understood, one or more of the various options described with reference to FIG. 22 may be used in a given wireless communication system at different times and/or according to different settings.

Figure 22:
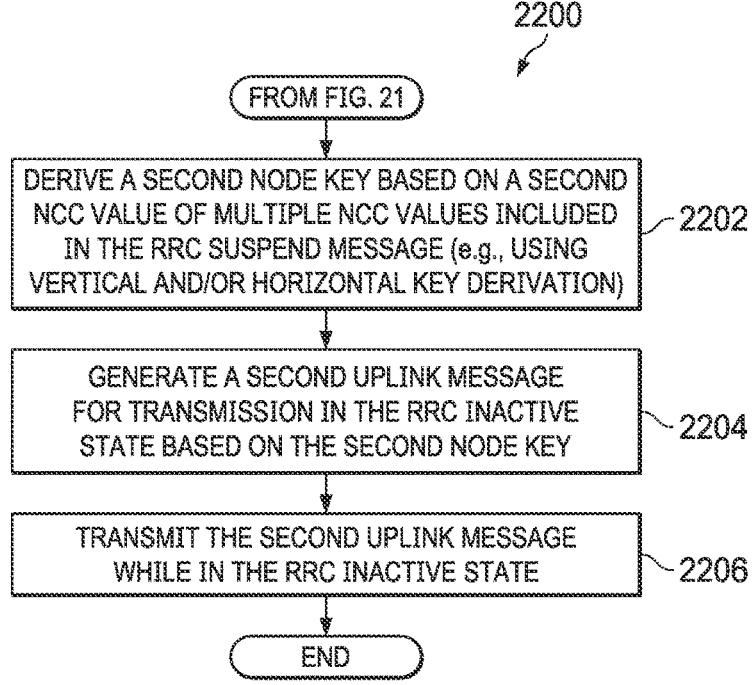
FIG. 22 is a flow diagram illustrating a technique for generating additional keys by the user device for inactive state data transmissions, in accordance with aspects of the present disclosure.

FIG. 22 is a flow diagram illustrating a technique 2200 for generating additional keys by the user device for inactive state data transmissions, in accordance with aspects of the present disclosure. At block 2202, a second node key may be derived based on a second NCC value of multiple NCC values included in the RCC suspend message. As examples, the second node key may be based on a previously used node key, a horizontally derived node key, or a vertically derived node key. At block 2204, a second uplink message may be generated for transmission in the RRC inactive state based on the second node key. At block 2206, the second uplink may be transmitted to a third node while in the RRC inactive state.

Figure 23:
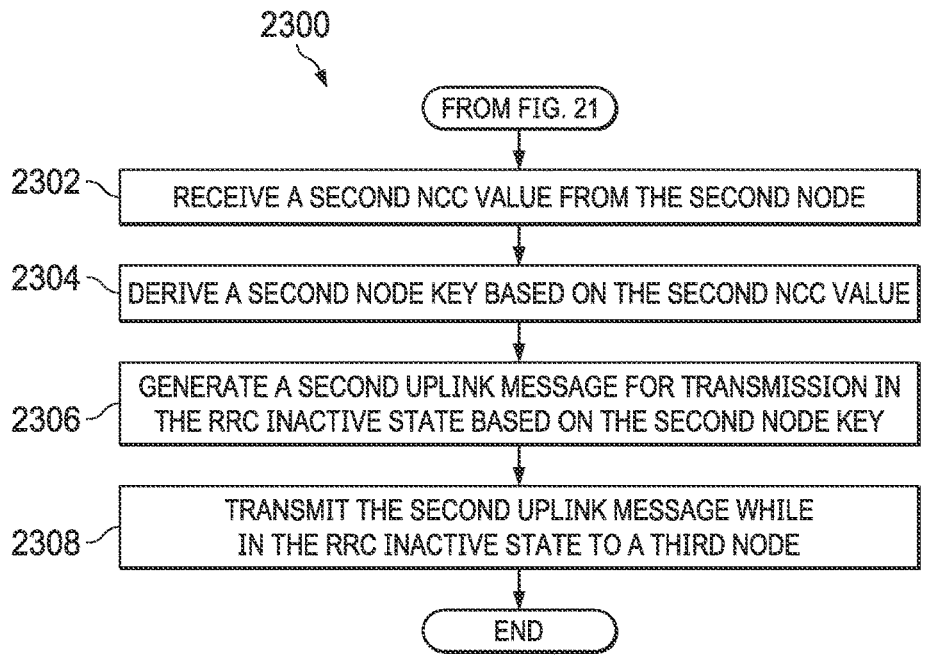
FIG. 23 is a flow diagram illustrating a technique for generating additional keys by the user device for inactive state data transmissions, in accordance with aspects of the present disclosure.

FIG. 23 is a flow diagram illustrating a technique 2300 for generating additional keys by the user device for inactive state data transmissions, in accordance with aspects of the present disclosure. At block 2302, a second NCC value may be received from the second node. At block 2304, a second node key may be derived based on the second NCC value. At block 2306, a second uplink message may be generated for transmission in the RRC inactive state based on the second node key. At block 2308, the second uplink message may be transmitted to a third node while in the RRC inactive state.

Figure 24:
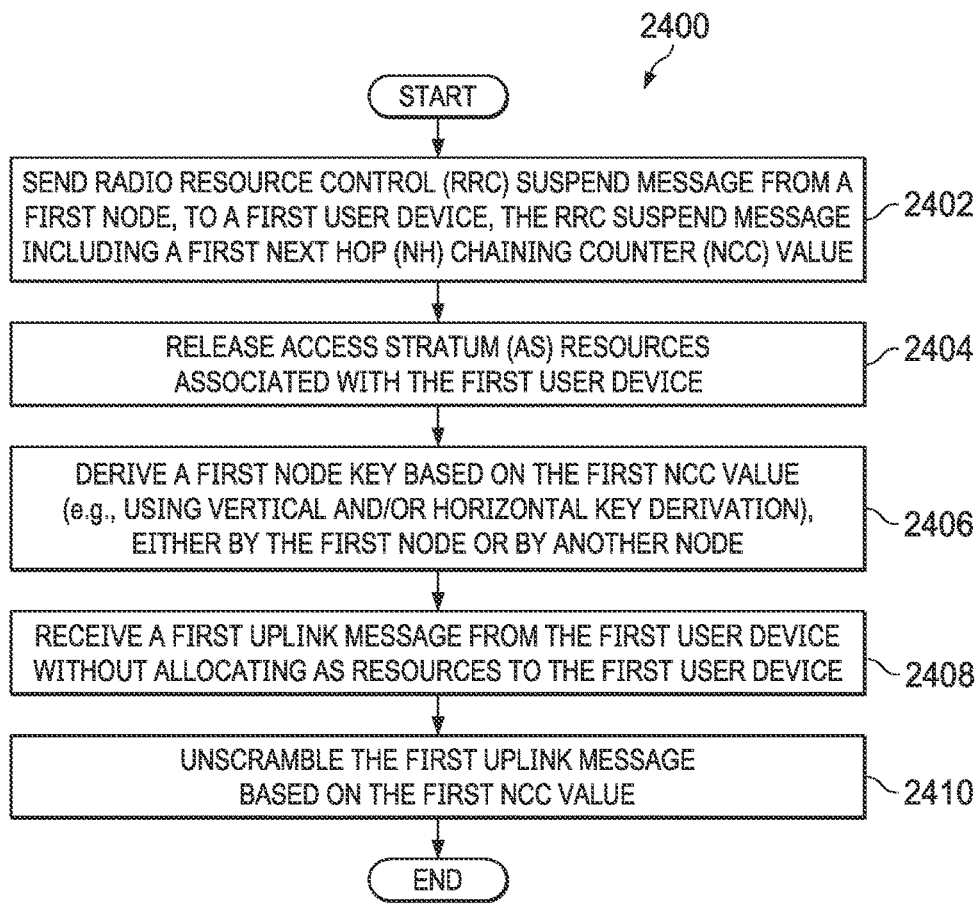
FIG. 24 is a flow diagram illustrating a technique for key generation by a node for inactive state data transmissions, in accordance with aspects of the present disclosure.

FIG. 24 is a flow diagram illustrating a technique 2400 for key generation by a node for inactive state data transmissions, in accordance with aspects of the present disclosure. At block 2402, a radio resource control (RRC) suspend message may be sent from a first node, to a first user device, the RRC suspend message including a first next hop (NH) chaining counter (NCC) value. At block 2204, access stratum (AS) resources associated with the first user device may be released. At block 2206, a first node key may be derived based on the first NCC value. As examples, the first node key may be based on a previously used node key, a horizontally derived node key, or a vertically derived node key. At block 2208, a first uplink message from the first user device may be received without allocating AS resources to the first user device. At block 2210, the first uplink message may be unscrambled based on the first NCC value. As may be understood, one or more of the various options described with reference to FIG. 24 may be used in a given wireless communication system at different times and/or according to different settings.

Figure 25:
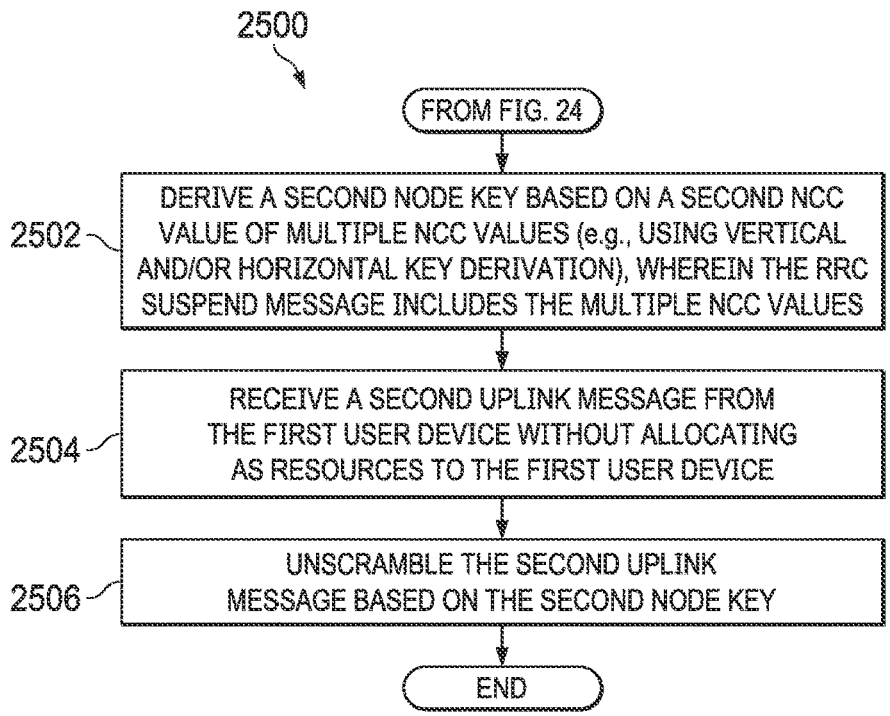
FIG. 25 is a flow diagram illustrating a technique for generating additional keys by node for inactive state data transmissions, in accordance with aspects of the present disclosure.

FIG. 25 is a flow diagram illustrating a technique 2500 for generating additional keys by node for inactive state data transmissions, in accordance with aspects of the present disclosure. At block 2502, a second node key may be derived based on a second NCC value of multiple NCC values, wherein the RCC suspend message includes the multiple NCC values. As examples, the second node key may be based on a previously used node key, a horizontally derived node key, or a vertically derived node key. At block 2504, a second uplink message may be received from the first user device without allocating AS resources to the first user device. At block 2506, the second uplink message may be unscrambled based on the second node key.

Figure 26:
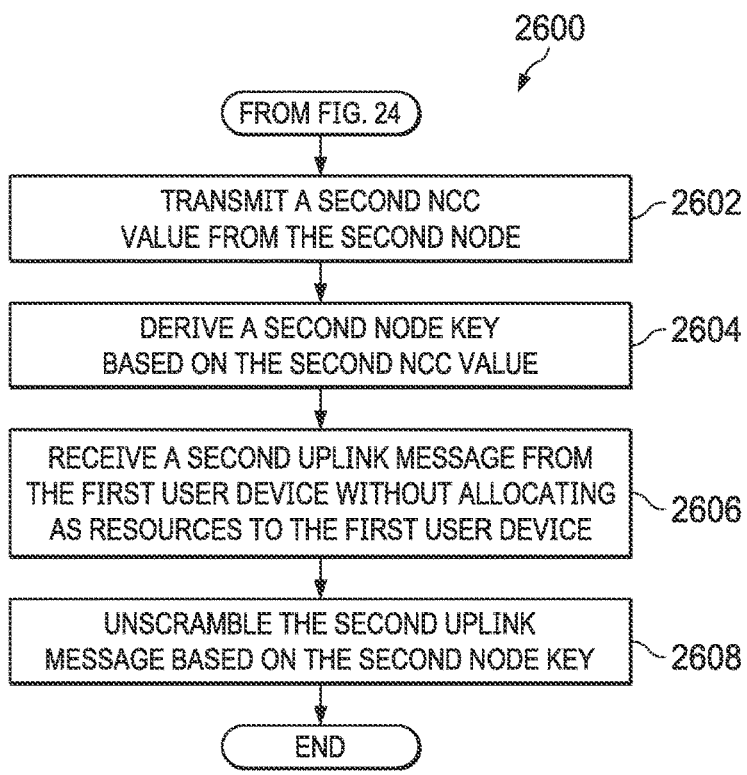
FIG. 26 is a flow diagram illustrating a technique for generating additional keys by node for inactive state data transmissions, in accordance with aspects of the present disclosure.

FIG. 26 is a flow diagram illustrating a technique 2600 for generating additional keys by node for inactive state data transmissions, in accordance with aspects of the present disclosure. At block 2602, a second NCC value may be transmitted form the second node. At block 2604, a second node key may be derived based on the second NCC value. At block 2606, a second uplink message may be received from the first user device without allocating AS resources to the first user device. At block 2608, the second uplink message may be unscrambled based on the second node key.

It is noted that, while the examples and aspects above focus primarily on methods to calculate the maximum number of non-overlapping CCEs in a carrier aggregation scenario, similar methodologies and formulae may also be applied for calculating the maximum number of PDCCH Candidates (i.e., M) in a wireless communication scenario. Similarly, while the examples and aspects above focus primarily methods to calculate the maximum number of non-overlapping CCEs in a carrier aggregation scenario, similar methodologies and formulae may also be applied for calculating limits on the number of blind decodes (BDs) that may be attempted by a UE in a carrier aggregation scenario, as well.

EXAMPLES

In the following sections, further examples are provided.

According to example 1, a method for security key derivation in a wireless system is disclosed, comprising: receiving a radio resource control (RRC) suspend message from a first node, the RRC suspend message including a first next hop (NH) chaining counter (NCC) value; entering a RRC inactive state; deriving a first node key based on the first NCC value for use in the RRC inactive state; generating a first uplink message for transmission in the RRC inactive state based on the first node key; and transmitting the first uplink message to a node while in the RRC inactive state.

Example 2 comprises the subject matter of example 1, wherein the first NCC value is unchanged from a second NCC value previously used to derive a second node key, and wherein the first node key is the same as the second node key.

Example 3 comprises the subject matter of example 1, wherein the first NCC value is unchanged from a second NCC value previously used to derive a second node key, and wherein deriving the first node key comprises horizontally deriving the first node key based on the second node key.

Example 4 comprises the subject matter of example 1, wherein the first NCC value is different from a second NCC value previously used to derive a second node key.

Example 5 comprises the subject matter of example 4, further comprising: receiving first cell information from a second node, wherein the first node key is vertically derived based on the first NCC value and the first cell information from the second node; generating a second uplink message for transmission in the RRC inactive state based on the first node key; and transmitting the second uplink message while in the RRC inactive state.

Example 6 comprises the subject matter of example 4, further comprising: receiving first cell information from a second node, wherein the first node key is vertically derived based on the first NCC value and the first cell information from the second node; horizontally deriving a third node key based on the first node key; generating a third uplink message for transmission in the RRC inactive state based on the third node key; and transmitting the third uplink message to a node while in the RRC inactive state.

Example 7 comprises the subject matter of example 5, further comprising: receiving third cell information from a third node; vertically deriving a fourth node key based on the first NCC value and the third cell information; generating a third uplink message for transmission in the RRC inactive state based on the fourth node key; and transmitting the third uplink message while in the RRC inactive state to the third node.

Example 8 comprises the subject matter of example 1, wherein the RRC suspend message includes multiple NCC values and further comprising: vertically deriving a second node key based on a second NCC value of the multiple NCC values; generating a second uplink message for transmission in the RRC inactive state based on the second node key; and transmitting the second uplink message to a node while in the RRC inactive state.

Example 9 comprises the subject matter of example 8, further comprising: determining that each NCC value of the multiple NCC values have been used to derive a node key; based on the determination that each NCC value of the multiple NCC values have been used, horizontally deriving a third node key based on a most recently used previous node key; generating a third uplink message for transmission in the RRC inactive state based on the third node key; and transmitting the third uplink message to a node while in the RRC inactive state.

Example 10 comprises the subject matter of example 8, further comprising: determining that each NCC value of the multiple NCC values have been used to derive a node key; generating a third uplink message for transmission in the RRC inactive state based on a most recently used previous node key; and transmitting the third uplink message to a node w % bile in the RRC inactive state.

Example 11 comprises the subject matter of example 8, further comprising: determining that each NCC value of the multiple NCC values have been used to derive a node key; and triggering a RRC resume procedure.

Example 12 comprises the subject matter of example 1, wherein the first uplink message is transmitted to a second node and further comprising: receiving a second NCC value from the second node; vertically deriving a second node key based on the second NCC value; generating a second uplink message for transmission in the RRC inactive state based on the second node key; and transmitting the second uplink message while in the RRC inactive state to a third node.

Example 13 comprises the subject matter of example 1, wherein the first uplink message is transmitted to a second node and further comprising: receiving a second NCC value from the second node; determining that the second NCC value is the same as the first NCC value; horizontally deriving a second node key based on the first or second NCC value; generating a second uplink message for transmission in the RRC inactive state based on the second node key; and transmitting the second uplink message while in the RRC inactive state to a third node.

According to example 14, a wireless device is disclosed, comprising: an antenna; a radio operably coupled to the antenna; and a processor operably coupled to the radio; wherein the wireless device is configured to: receive a radio resource control (RRC) suspend message from a first node, the RRC suspend message including a first next hop (NH) chaining counter (NCC) value; enter an RRC inactive state; derive a first node key based on the first NCC value for use in the RRC inactive state; generate a first uplink message for transmission in the RRC inactive state based on the first node key; and transmit the first uplink message to a node while in the RRC inactive state.

Example 15 comprises the subject matter of example 14, wherein the first NCC value is unchanged from a second NCC value previously used to derive a second node key, and wherein the first node key is the same as the second node key.

Example 16 comprises the subject matter of example 14, wherein the first NCC value is unchanged from a second NCC value previously used to derive a second node key, and wherein deriving the first node key comprises horizontally deriving the first node key based on the second node key.

Example 17 comprises the subject matter of example 14, wherein the first NCC value is different from a second NCC value previously used to derive a second node key.

Example 18 comprises the subject matter of example 17, wherein the wireless device is further configured to: receive first cell information from a second node, wherein the first node key is vertically derived based on the first NCC value and the first cell information from the second node; generate a second uplink message for transmission in the RRC inactive state based on the first node key, and transmit the second uplink message while in the RRC inactive state.

Example 19 comprises the subject matter of example 18, wherein the wireless device is further configured to: receive first cell information from the second node, wherein the first node key is vertically derived based on the first NCC value and the first cell information from the second node; horizontally derive a third node key based on the first node key; generate a third uplink message for transmission in the RRC inactive state based on the third node key; and transmit the third uplink message to a node while in the RRC inactive state.

Example 20 comprises the subject matter of example 18, wherein the wireless device is further configured to: receive third cell information from a third node; vertically derive a fourth node key based on the first NCC value and the third cell information; generate a third uplink message for transmission in the RRC inactive state based on the fourth node key; and transmit the third uplink message while in the RRC inactive state to the third node.

Example 21 comprises the subject matter of example 14, wherein the RRC suspend message includes multiple NCC values and the wireless device is further configured to: vertically derive a second node key based on a second NCC value of the multiple NCC values; generate a second uplink message for transmission in the RRC inactive state based on the second node key; and transmit the second uplink message to a node while in the RRC inactive state.

Example 22 comprises the subject matter of example 21, wherein the wireless device is further configured to: determine that each NCC value of the multiple NCC values have been used to derive a node key; based on the determination that each NCC value of the multiple NCC values have been used, horizontally derive a third node key based on a most recently used previous node key; generate a third uplink message for transmission in the RRC inactive state based on the third node key; and transmit the third uplink message to a node while in the RRC inactive state.

Example 23 comprises the subject matter of example 21, wherein the wireless device is further configured to: determine that each NCC value of the multiple NCC values have been used to derive a node key; generate a third uplink message for transmission in the RRC inactive state based on a most recently used previous node key; and transmit the third uplink message to a node while in the RRC inactive state.

Example 24 comprises the subject matter of example 21, wherein the wireless device is further configured to: determine that each NCC value of the multiple NCC values have been used to derive a node key; and trigger a RRC resume procedure.

Example 25 comprises the subject matter of example 14, wherein the first uplink message is transmitted to a second node and the wireless device is further configured to: receive a second NCC value from the second node; vertically derive a second node key based on the second NCC value; generate a second uplink message for transmission in the RRC inactive state based on the second node key; and transmit the second uplink message while in the RRC inactive state to a third node.

Example 26 comprises the subject matter of example 14, wherein the first uplink message is transmitted to a second node and the wireless device is further configured to: receive a second NCC value from the second node; determine that the second NCC value is the same as the first NCC value; horizontally derive a second node key based on the first or second NCC value; generate a second uplink message for transmission in the RRC inactive state based on the second node key; and transmit the second uplink message while in the RRC inactive state to a third node.

According to example 27, an integrated circuit is disclosed, comprising circuitry configured to: cause a wireless device to receive a radio resource control (RRC) suspend message from a first node, the RRC suspend message including a first next hop (NH) chaining counter (NCC) value; cause a wireless device to enter an RRC inactive state; derive a first node key based on the first NCC value for use in the RRC inactive state; generate a first uplink message for transmission in the RRC inactive state based on the first node key; and cause a wireless device to transmit the first uplink message to a node while in the RRC inactive state.

Example 28 comprises the subject matter of example 27, wherein the first NCC value is unchanged from a second NCC value previously used to derive a second node key, and wherein the first node key is the same as the second node key.

Example 29 comprises the subject matter of example 27, wherein the first NCC value is unchanged from a second NCC value previously used to derive a second node key, and wherein deriving the first node key comprises horizontally deriving the first node key based on the second node key.

Example 30 comprises the subject matter of example 27, wherein the first NCC value is different from a second NCC value previously used to derive a second node key.

Example 31 comprises the subject matter of example 30, wherein the circuitry is further configured to: cause the wireless device to receive first cell information from a second node, wherein the first node key is vertically derived based on the first NCC value and the first cell information from the second node; generate a second uplink message for transmission in the RRC inactive state based on the first node key; and cause the wireless device to transmit the second uplink message while in the RRC inactive state.

Example 32 comprises the subject matter of example 31, wherein the circuitry is further configured to: cause the wireless device to receive first cell information from the second node, wherein the first node key is vertically derived based on the first NCC value and the first cell information from the second node; horizontally derive a third node key based on the first node key; generate a third uplink message for transmission in the RRC inactive state based on the third node key; and cause the wireless device to transmit the third uplink message to a node while in the RRC inactive state.

Example 33 comprises the subject matter of example 31, wherein the circuitry is further configured to: cause the wireless device to receive third cell information from a third node; vertically derive a fourth node key based on the first NCC value and the third cell information; generate a third uplink message for transmission in the RRC inactive state based on the fourth node key; and cause the wireless device to transmit the third uplink message while in the RRC inactive state to the third node.

Example 34 comprises the subject matter of example 27, wherein the RRC suspend message includes multiple NCC values and wherein the circuitry is further configured to: vertically derive a second node key based on a second NCC value of the multiple NCC values; generate a second uplink message for transmission in the RRC inactive state based on the second node key, and cause the wireless device to transmit the second uplink message to a node while in the RRC inactive state.

Example 35 comprises the subject matter of example 34, wherein the circuitry is further configured to: determine that each NCC value of the multiple NCC values have been used to derive a node key; based on the determination that each NCC value of the multiple NCC values have been used, horizontally derive a third node key based on a most recently used previous node key; generate a third uplink message for transmission in the RRC inactive state based on the third node key; and cause the wireless device to transmit the third uplink message to a node while in the RRC inactive state.

Example 36 comprises the subject matter of example 34, wherein the circuitry is further configured to: determine that each NCC value of the multiple NCC values have been used to derive a node key; generate a third uplink message for transmission in the RRC inactive state based on a most recently used previous node key; and cause the wireless device to transmit the third uplink message to a node while in the RRC inactive state.

Example 37 comprises the subject matter of example 34, wherein the circuitry is further configured to: determine that each NCC value of the multiple NCC values have been used to derive a node key; and trigger a RRC resume procedure.

Example 38 comprises the subject matter of example 27, wherein the first uplink message is transmitted to a second node and wherein the circuitry is further configured to: cause the wireless device to receive a second NCC value from the second node; vertically derive a second node key based on the second NCC value; generate a second uplink message for transmission in the RRC inactive state based on the second node key; and cause the wireless device to transmit the second uplink message while in the RRC inactive state to a third node.

Example 39 comprises the subject matter of example 27, wherein the first uplink message is transmitted to a second node and wherein the circuitry is further configured to: cause the wireless device to receive a second NCC value from the second node; determine that the second NCC value is the same as the first NCC value; horizontally derive a second node key based on the first or second NCC value; generate a second uplink message for transmission in the RRC inactive state based on the second node key; and cause the wireless device to transmit the second uplink message while in the RRC inactive state to a third node.

According to example 40, a method for security key derivation in a wireless system is disclosed, comprising: sending a radio resource control (RRC) suspend message from a first node, to a first user device, the RRC suspend message including a first next hop (NH) chaining counter (NCC) value; releasing access stratum (AS) resources associated with the first user device; deriving a first node key based on the first NCC value for use in the RRC inactive state; receiving a first uplink message from the first user device without allocating AS resources to the first user device; and unscrambling the first uplink message based on the first NCC value.

Example 41 comprises the subject matter of example 40, wherein the first uplink message is transmitted to a second node, and wherein the first node key is derived by the first node, and further comprising: receiving a request for the first node key by a second node; and transmitting the first node key to the second node.

Example 42 comprises the subject matter of example 40, wherein the first uplink message is transmitted to a second node, and further comprising transmitting the first NCC value to the second node, wherein the first node key is derived by the second node.

Example 43 comprises the subject matter of example 42, wherein the first NCC value is transmitted to the second node in response to a request for the first node key by the second node.

Example 44 comprises the subject matter of example 40-43, wherein the first NCC value is unchanged from a second NCC value previously used to derive a second node key, and wherein the first node key is the same as the second node key.

Example 45 comprises the subject matter of example 40-43, wherein the first NCC value is unchanged from a second NCC value previously used to derive a second node key, and wherein deriving the first node key comprises horizontally deriving the first node key based on the second node key.

Example 46 comprises the subject matter of example 40-43, wherein the first NCC value is different from a second NCC value previously used to derive a second node key.

Example 47 comprises the subject matter of example 46, further comprising: transmitting first cell information from a second node, wherein the first node key is derived based on the first NCC value and the first cell information from the second node; receiving a second uplink message from the first user device without allocating AS resources to the first user device; and unscrambling the second uplink message based on the first node key.

Example 48 comprises the subject matter of example 46, further comprising: transmitting first cell information from a second node, wherein the first node key is derived based on the first NCC value and the first cell information from the second node; horizontally deriving a third node key based on the first node key; receiving a third uplink message from the first user device without allocating AS resources to the first user device; and unscrambling the third uplink message based on the third node key.

Example 49 comprises the subject matter of example 47, further comprising: transmitting third cell information from a third node; deriving a fourth node key based on the first NCC value and the third cell information; receiving a third uplink message from the first user device without allocating AS resources to the first user device; and unscrambling the third uplink message based on the fourth node key.

Example 50 comprises the subject matter of example 40-43, wherein the RRC suspend message includes multiple NCC values and further comprising: deriving a second node key based on a second NCC value of the multiple NCC values; receiving a second uplink message from the first user device without allocating AS resources to the first user device; and unscrambling the second uplink message based on the second node key.

Example 51 comprises the subject matter of example 50, further comprising: determining that each NCC value of the multiple NCC values have been used to derive a node key; based on the determination that each NCC value of the multiple NCC values have been used, horizontally deriving a third node key based on a most recently used previous node key; receiving a third uplink message from the first user device without allocating AS resources to the first user device; and unscrambling the second uplink message based on the third node key.

Example 52 comprises the subject matter of example 50, further comprising: determining that each NCC value of the multiple NCC values have been used to derive a node key; receiving a second uplink message from the first user device without allocating AS resources to the first user device; and unscrambling the second uplink message based on a most recently used previous node key.

Example 53 comprises the subject matter of example 50, further comprising: receiving a RRC resume request from the first user device after each NCC value of the multiple NCC values have been used to derive a node key; and transmitting another RRC suspend message that includes another set of multiple NCC values to the first user device.

Example 54 comprises the subject matter of example 40-43, wherein the first uplink message is transmitted to a second node and further comprising: transmitting a second NCC value from the second node; deriving a second node key based on the second NCC value; receiving a second uplink message from the first user device without allocating AS resources to the first user device; and unscrambling the second uplink message based on the second node key.

Example 55 comprises the subject matter of example 40-43, wherein the first uplink message is transmitted to a second node and further comprising: transmitting the first NCC value from the second node; horizontally deriving a second node key based on the first NCC value; receiving a second uplink message from the first user device without allocating AS resources to the first user device; and unscrambling the second uplink message based on the second node key.

According to example 56, an apparatus is disclosed, comprising: a processor configured to: send a radio resource control (RRC) suspend message from the apparatus, to a first user device, the RRC suspend message including a first next hop (NH) chaining counter (NCC) value; release access stratum (AS) resources associated with the first user device; derive a first node key based on the first NCC value for use in the RRC inactive state; receive a first uplink message from the first user device without allocating AS resources to the first user device; and unscramble the first uplink message based on the first NCC value.

Example 57 comprises the subject matter of example 56, wherein the first uplink message is transmitted to a second node, and wherein the first node key is derived by the apparatus, and wherein the processor is further configured to: receiving a request for the first node key by a second node; and transmitting the first node key to the second node.

Example 58 comprises the subject matter of example 56, wherein the first uplink message is transmitted to a second node, and wherein the processor is further configured to transmit the first NCC value to the second node, wherein the first node key is derived by the second node.

Example 59 comprises the subject matter of example 58, wherein the first NCC value is transmitted to the second node in response to a request for the first node key by the second node.

Example 60 comprises the subject matter of example 56-59, wherein the first NCC value is unchanged from a second NCC value previously used to derive a second node key, and wherein the first node key is the same as the second node key.

Example 61 comprises the subject matter of example 56-59, wherein the first NCC value is unchanged from a second NCC value previously used to derive a second node key, and wherein deriving the first node key comprises horizontally deriving the first node key based on the second node key.

Example 62 comprises the subject matter of example 56-59, wherein the first NCC value is different from a second NCC value previously used to derive a second node key.

Example 63 comprises the subject matter of example 62, wherein the processor is further configured to: transmit first cell information from a second node, wherein the first node key is derived based on the first NCC value and the first cell information from the second node; receive a second uplink message from the first user device without allocating AS resources to the first user device, and unscramble the second uplink message based on the first node key.

Example 64 comprises the subject matter of example 62, wherein the processor is further configured to: transmit first cell information from the first node, wherein the first node key is derived based on the first NCC value and the first cell information from the first node, horizontally derive a third node key based on the first node key; receive a third uplink message from the first user device without allocating AS resources to the first user device; and unscramble the third uplink message based on the third node key.

Example 65 comprises the subject matter of example 64, wherein the processor is further configured to: transmit third cell information from a third node; derive a fourth node key based on the first NCC value and the third cell information; receive a third uplink message from the first user device without allocating AS resources to the first user device; and unscramble the third uplink message based on the fourth node key.

Example 66 comprises the subject matter of example 56-59, wherein the RRC suspend message includes multiple NCC values and the processor is further configured to: derive a second node key based on a second NCC value of the multiple NCC values; receive a second uplink message from the first user device without allocating AS resources to the first user device; and unscramble the second uplink message based on the second node key.

Example 67 comprises the subject matter of example 66, wherein the processor is further configured to: determine that each NCC value of the multiple NCC values have been used to derive a node key; based on the determination that each NCC value of the multiple NCC values have been used, horizontally derive a third node key based on a most recently used previous node key; receive a third uplink message from the first user device without allocating AS resources to the first user device; and unscramble the second uplink message based on the third node key.

Example 68 comprises the subject matter of example 66, wherein the processor is further configured to: determine that each NCC value of the multiple NCC values have been used to derive a node key; receive a second uplink message from the first user device without allocating AS resources to the first user device; and unscramble the second uplink message based on a most recently used previous node key.

Example 69 comprises the subject matter of example 66, wherein the processor is further configured to: receive a RRC resume request from the first user device after each NCC value of the multiple NCC values have been used to derive a node key; and transmit another RRC suspend message that includes another set of multiple NCC values to the first user device.

Example 70 comprises the subject matter of example 56-59, wherein the first uplink message is transmitted to a second node and the processor is further configured to: transmit a second NCC value from the second node; derive a second node key based on the second NCC value; receive a second uplink message from the first user device without allocating AS resources to the first user device; and unscramble the second uplink message based on the second node key.

Example 71 comprises the subject matter of example 56-59, wherein the first uplink message is transmitted to a second node and the processor is further configured to: transmit the first NCC value from the second node; horizontally derive a second node key based on the first NCC value; receive a second uplink message from the first user device without allocating AS resources to the first user device; and unscramble the second uplink message based on the second node key.

Yet another exemplary example may include a method, comprising, by a device, performing any or all parts of the preceding Examples.

A yet further exemplary example may include a non-transitory computer-accessible memory medium comprising program instructions which, when executed at a device, cause the device to implement any or all parts of any of the preceding Examples.

A still further exemplary example may include a computer program comprising instructions for performing any or all parts of any of the preceding Examples.

Yet another exemplary example may include an apparatus comprising means for performing any or all of the elements of any of the preceding Examples.

Still another exemplary example may include an apparatus comprising a processor configured to cause a device to perform any or all of the elements of any of the preceding Examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method, e.g., any of a method examples described herein, or, any combination of the method examples described herein, or, any subset of any of the method examples described herein, or, any combination of such subsets.

In some examples, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method examples described herein (or, any combination of the method examples described herein, or, any subset of any of the method examples described herein, or, any combination of such subsets). The device may be realized in any of various forms.

Although the examples above have been described in considerable detail, numerous variations and modifications will become apparent to those skilled in the art once the above disclosure is fully appreciated. It is intended that the following claims be interpreted to embrace all such variations and modifications.

What is claimed is:

1. A method for security key derivation in a wireless system, comprising:
   receiving a radio resource control (RRC) suspend message from a first node, the RRC suspend message including multiple next hop (NH) chaining counter (NCC) values;
   entering an RRC inactive state;
   deriving a first node key based on a first NCC value of the multiple NCC values for use in the RRC inactive state;
   generating a first uplink message for transmission in the RRC inactive state based on the first node key;
   transmitting the first uplink message to a node while in the RRC inactive state;
   vertically deriving a second node key based on a second NCC value of the multiple NCC values;
   transmitting a second uplink message to a node while in the RRC inactive state, wherein the second uplink message is generated based on the second node key;
   determining that each NCC value of the multiple NCC values have been used to derive a node key; and
   transmitting a third uplink message to a node while in the RRC inactive state, wherein the third uplink message is generated based on a most recently used previous node key.

2. The method of claim 1, wherein the first NCC value is different from the second NCC value.

3. The method of claim 2, further comprising:
   receiving first cell information from a second node, wherein the first node key is vertically derived based on the first NCC value and the first cell information from the second node.

4. The method of claim 3, further comprising:
   receiving third cell information from a third node;
   vertically deriving a fourth node key based on the first NCC value and the third cell information; and
   transmitting a fourth uplink message while in the RRC inactive state to the third node, wherein the fourth uplink message is generated based on the fourth node key.

5. The method of claim 2, further comprising:
   receiving first cell information from a second node, wherein the first node key is vertically derived based on the first NCC value and the first cell information from the second node;
   horizontally deriving a third node key based on the first node key; and
   transmitting a fourth uplink message to a node while in the RRC inactive state, wherein the fourth uplink message is generated based on the third node key.

6. The method of claim 1, further comprising:
   triggering an RRC resume procedure.

7. The method of claim 1, wherein the first uplink message is transmitted to a second node and further comprising:
   receiving a second NCC value of the multiple NDD values from the second node;
   wherein transmitting the second uplink message to a node while in the RRC inactive state further comprises transmitting the second uplink message to a third node while in the RRC inactive state.

8. A wireless device comprising:
   an antenna;
   a radio operably coupled to the antenna; and
   a processor operably coupled to the radio;
   wherein the wireless device is configured to:
     receive a radio resource control (RRC) suspend message from a first node, the RRC suspend message including multiple next hop (NH) chaining counter (NCC) values;
     enter an RRC inactive state;
     derive a first node key based on a first NCC value of the multiple NCC values for use in the RRC inactive state;
     generate a first uplink message for transmission in the RRC inactive state based on the first node key;
     transmit the first uplink message to a node while in the RRC inactive state;
     vertically derive a second node key based on a second NCC value of the multiple NCC values;
     transmit a second uplink message to a node while in the RRC inactive state, wherein the second uplink message is generated based on the second node key;
     determine that each NCC value of the multiple NCC values have been used to derive a node key; and
     transmit a third uplink message to a node while in the RRC inactive state, wherein the third uplink message is generated based on a most recently used previous node key.

9. The wireless device of claim 8, wherein the first NCC value is different from the second NCC value.

10. The wireless device of claim 9, wherein the wireless device is further configured to:
    receive first cell information from a second node, wherein the first node key is vertically derived based on the first NCC value and the first cell information from the second node.

11. The wireless device of claim 10, wherein the wireless device is further configured to:
    receive first cell information from the second node, wherein the first node key is vertically derived based on the first NCC value and the first cell information from the second node;
    horizontally derive a third node key based on the first node key; and
    transmit a fourth uplink message to a node while in the RRC inactive state, wherein the fourth uplink message is generated based on the third node key.

12. The wireless device of claim 10, wherein the wireless device is further configured to:
   receive third cell information from a third node;
   vertically derive a fourth node key based on the first NCC value and the third cell information; and
   transmit the third a fourth uplink message while in the RRC inactive state to the third node, wherein the fourth uplink message is generated based on the fourth node key.

13. The wireless device of claim 8, wherein the wireless device is further configured to:
   transmit the first uplink message to a second node; and
   receive a second NCC value of the multiple NCC values from the second node, wherein transmitting the second uplink message to a node while in the RRC inactive state further comprises transmitting the second uplink message to a third node while in the RRC inactive state.

14. An integrated circuit, comprising circuitry configured to:
   cause a wireless device to receive a radio resource control (RRC) suspend message from a first node, the RRC suspend message including multiple next hop (NH) chaining counter (NCC) values;
   cause the wireless device to enter an RRC inactive state;
   derive a first node key based on a first NCC value of the multiple NCC values for use in the RRC inactive state;
   generate a first uplink message for transmission in the RRC inactive state based on the first node key;
   cause the wireless device to transmit the first uplink message to a node while in the RRC inactive state;
   vertically derive a second node key based on a second NCC value of the multiple NCC values;
   cause the wireless device to transmit a second uplink message to a node while in the RRC inactive state, wherein the second uplink message is generated based on the second node key;
   determine that each NCC value of the multiple NCC values have been used to derive a node key; and
   cause the wireless device to transmit a third uplink message to a node while in the RRC inactive state, wherein the third uplink message is generated based on a most recently used previous node key.

15. The integrated circuit of claim 14, wherein the first NCC value is different from the second NCC value.

16. The integrated circuit of claim 15, wherein the circuitry is further configured to:
   cause the wireless device to receive first cell information from a second node, wherein the first node key is vertically derived based on the first NCC value and the first cell information from the second node;
   horizontally derive a third node key based on the first node key; and
   cause the wireless device to transmit a fourth uplink message to a node while in the RRC inactive state, wherein the fourth uplink message is generated based on the third node key.

17. The integrated circuit of claim 15, wherein the circuitry is further configured to:
   cause the wireless device to receive third cell information from a third node;
   vertically derive a fourth node key based on the first NCC value and the third cell information; and
   cause the wireless device to transmit the fourth uplink message while in the RRC inactive state to the third node, wherein the fourth uplink message is generated based on the fourth node key.

18. The integrated circuit of claim 14, wherein the circuitry is further configured to:
   cause the wireless device to receive first cell information from a second node, wherein the first node key is vertically derived based on the first NCC value and the first cell information from the second node.

19. The integrated circuit of claim 14, wherein the circuitry is further configured to:
   cause the wireless device to trigger an RRC resume procedure.

20. The integrated circuit of claim 14, wherein the circuitry is further configured to:
   cause the wireless device to transmit the first uplink message to a second node; and
   cause the wireless device to receive a second NCC value of the multiple NCC values from the second node,
   wherein causing the wireless device to transmit the second uplink message to a node while in the RRC inactive state further comprises causing the wireless device to transmit the second uplink message to a third node while in the RRC inactive state.

* * * * *

UNITED STATES PATENT AND TRADEMARK OFFICE
CERTIFICATE OF CORRECTION

PATENT NO. : 12,052,566 B2
APPLICATION NO. : 17/593666
DATED : July 30, 2024
INVENTOR(S) : Fangli Xu et al.

It is certified that error appears in the above-identified patent and that said Letters Patent is hereby corrected as shown below:

In the Claims

Claim 12, Column 47, Line 6: delete the phrase "the third" after -- transmit --

Signed and Sealed this
Nineteenth Day of August, 2025

Coke Morgan Stewart
*Acting Director of the United States Patent and Trademark Office*